Feb. 14, 1956   S. R. HURSH ET AL   2,734,463
RAILWAY TRACK BALLAST TAMPING APPARATUS
Filed Oct. 5, 1950   20 Sheets-Sheet 1
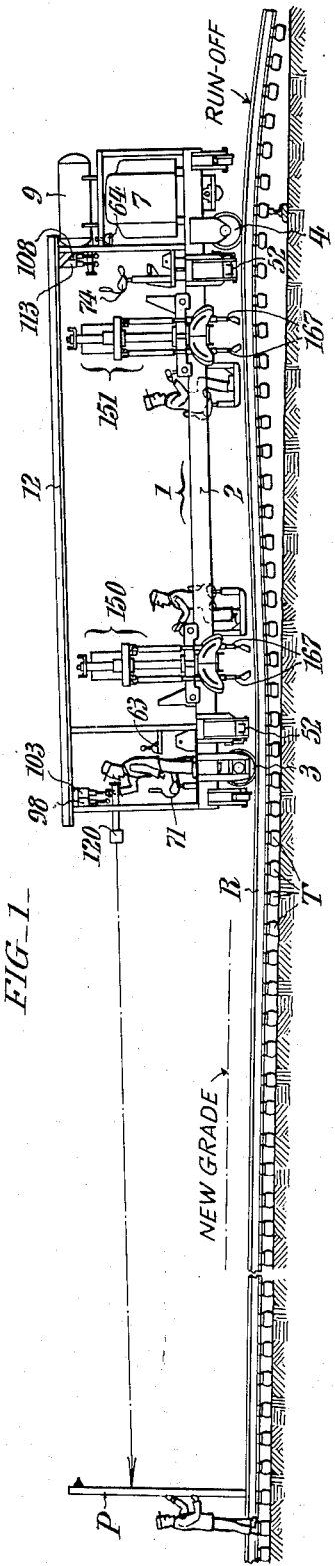
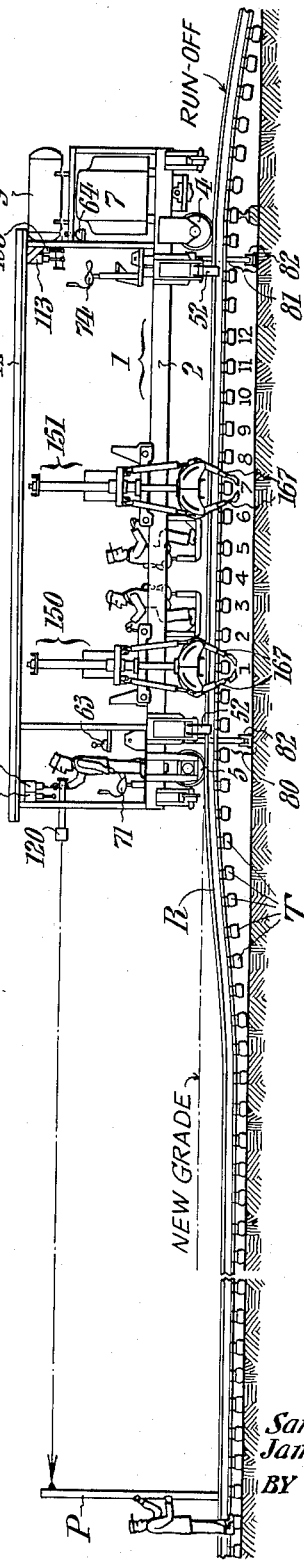
INVENTORS:
Samuel R. Hursh &
James B. McWilliams,
BY Paul & Paul
ATTORNEYS.

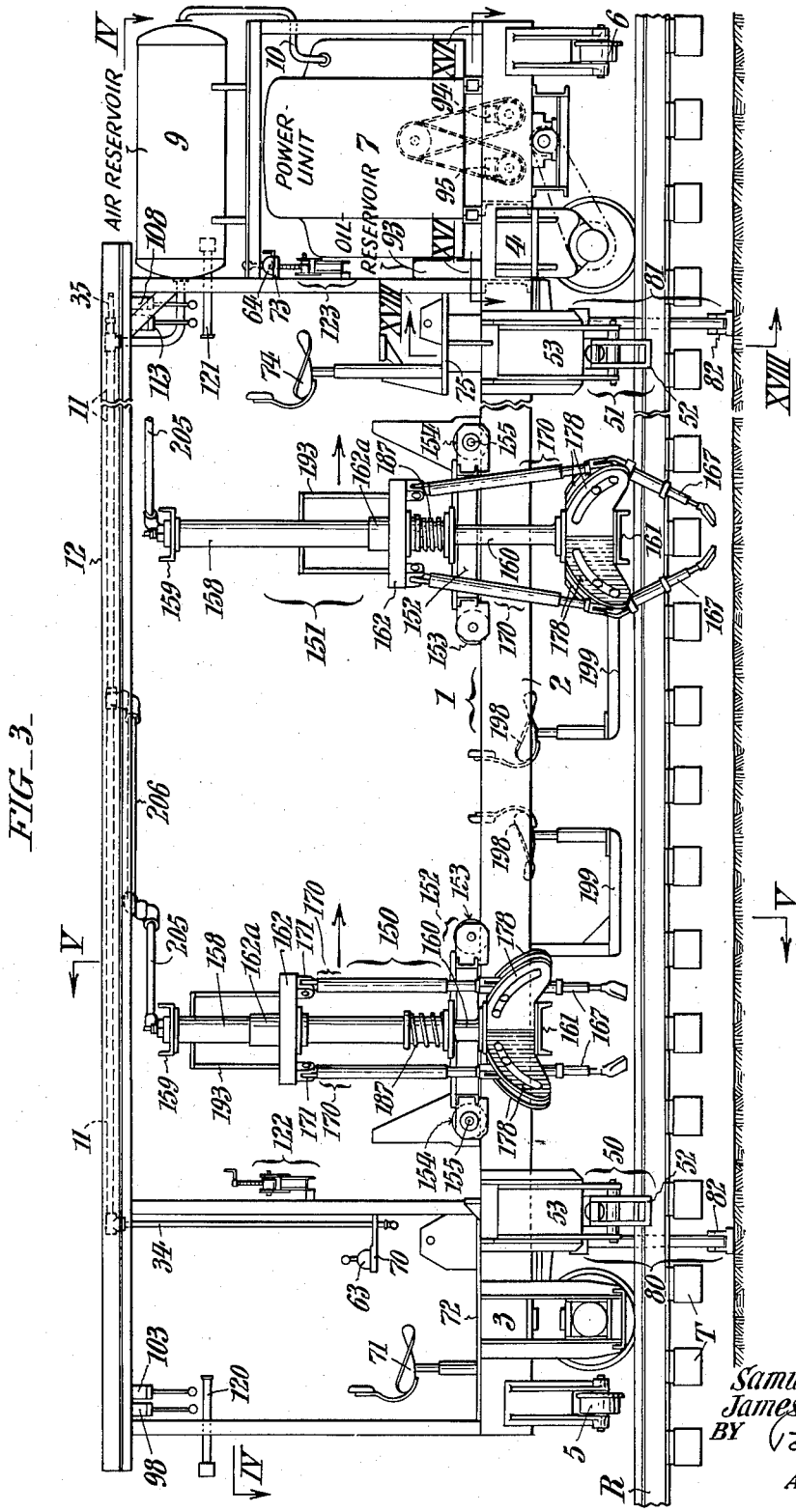

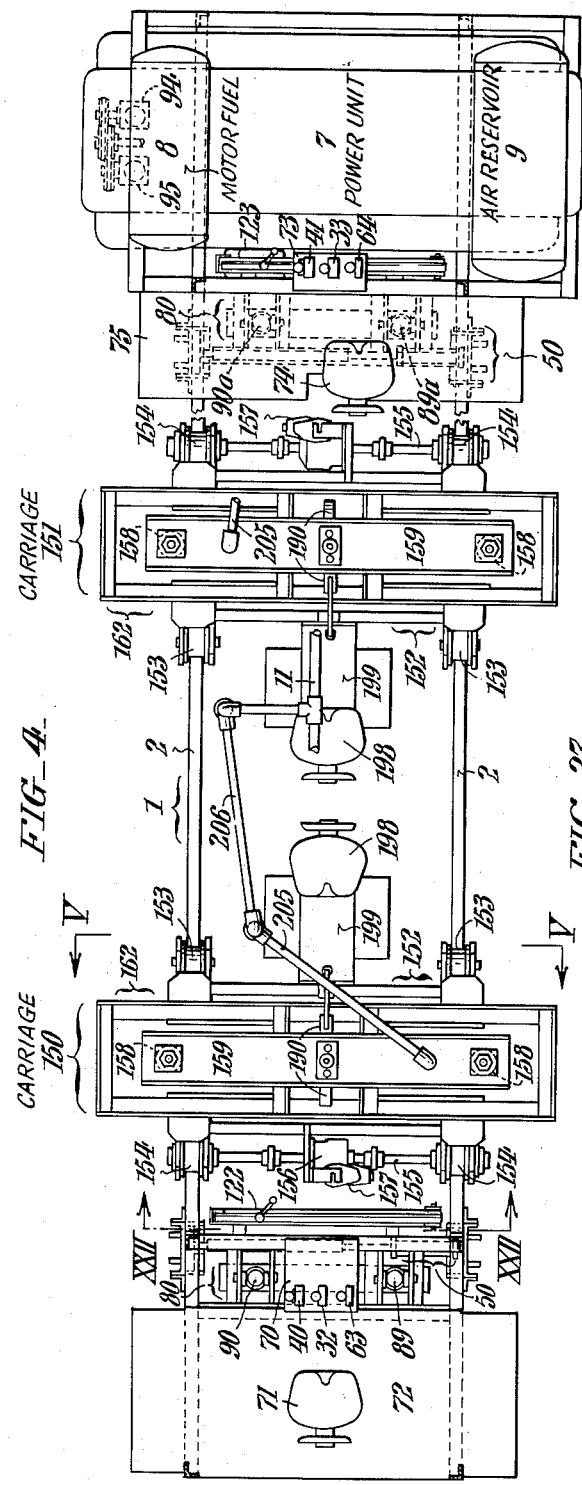

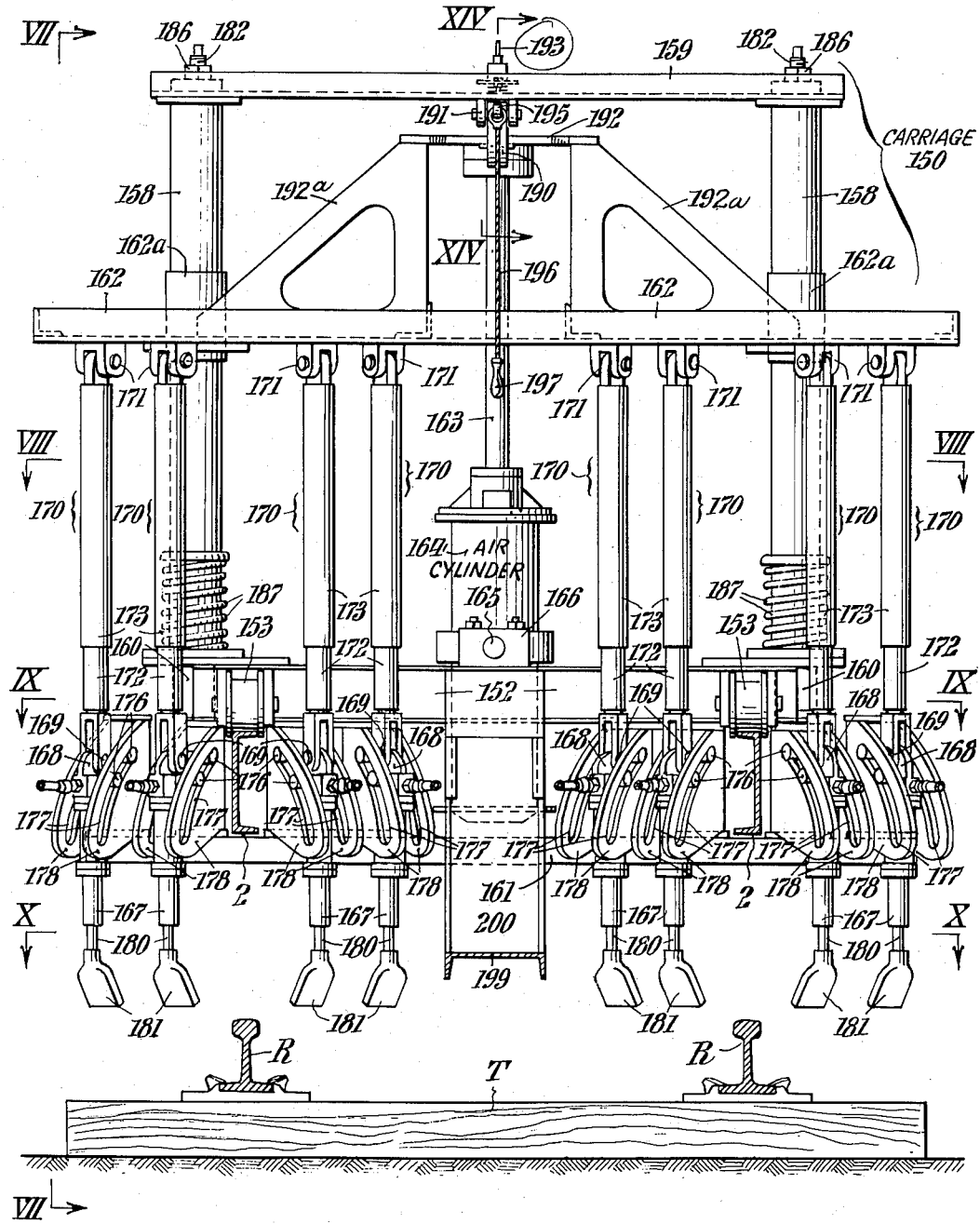

Feb. 14, 1956 S. R. HURSH ET AL 2,734,463
RAILWAY TRACK BALLAST TAMPING APPARATUS
Filed Oct. 5, 1950 20 Sheets-Sheet 5
FIG_6_
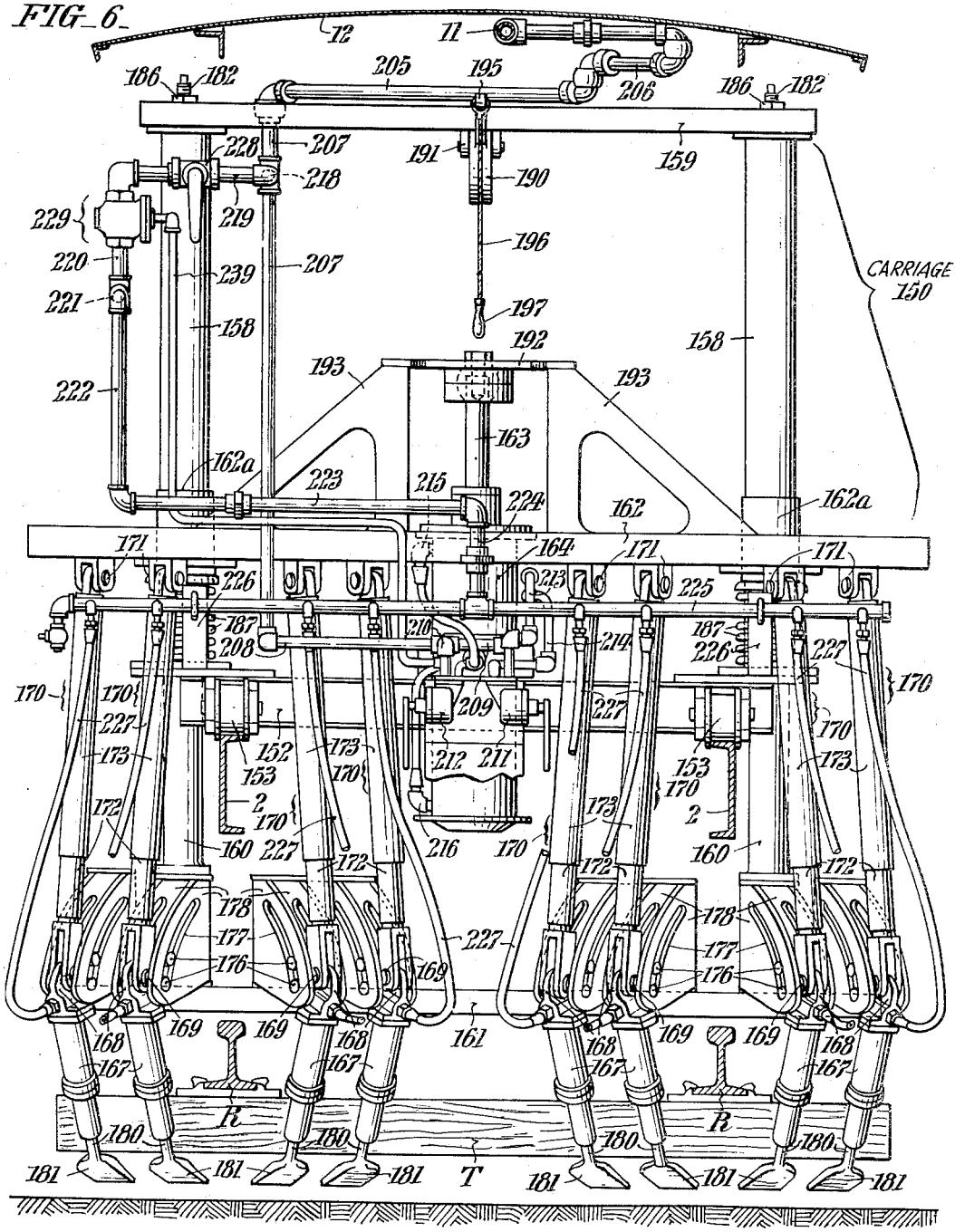
INVENTORS:
Samuel R. Hursh &
James B. McWilliams,
BY Paul & Paul
ATTORNEYS.

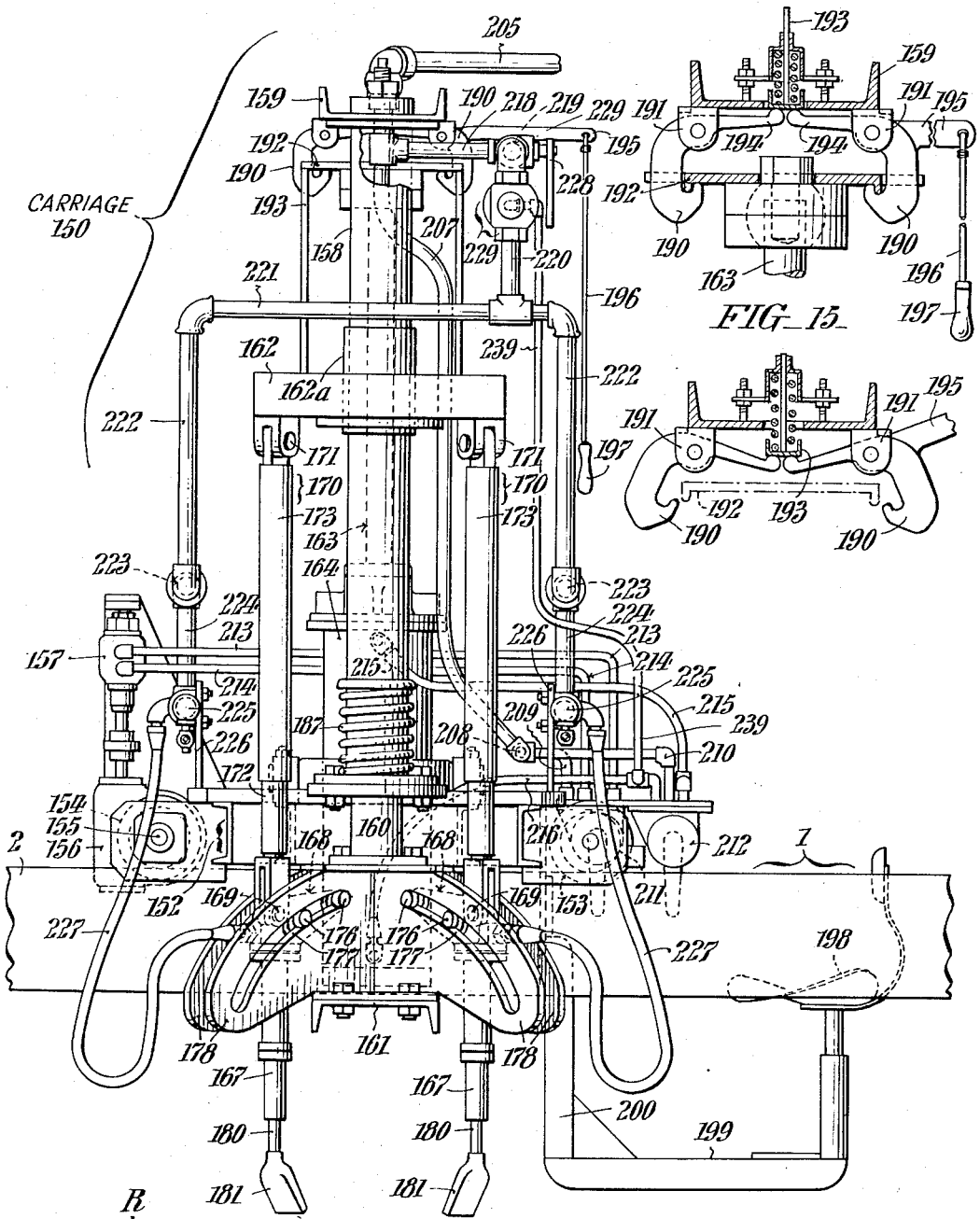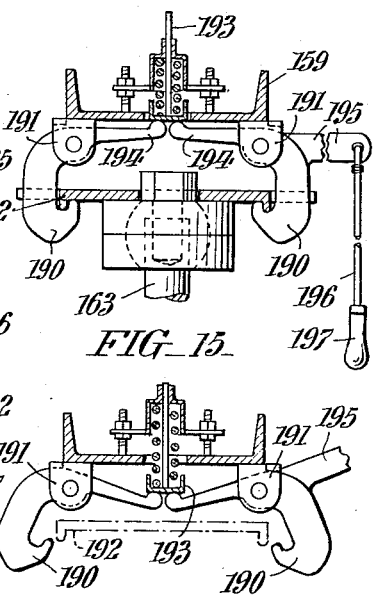

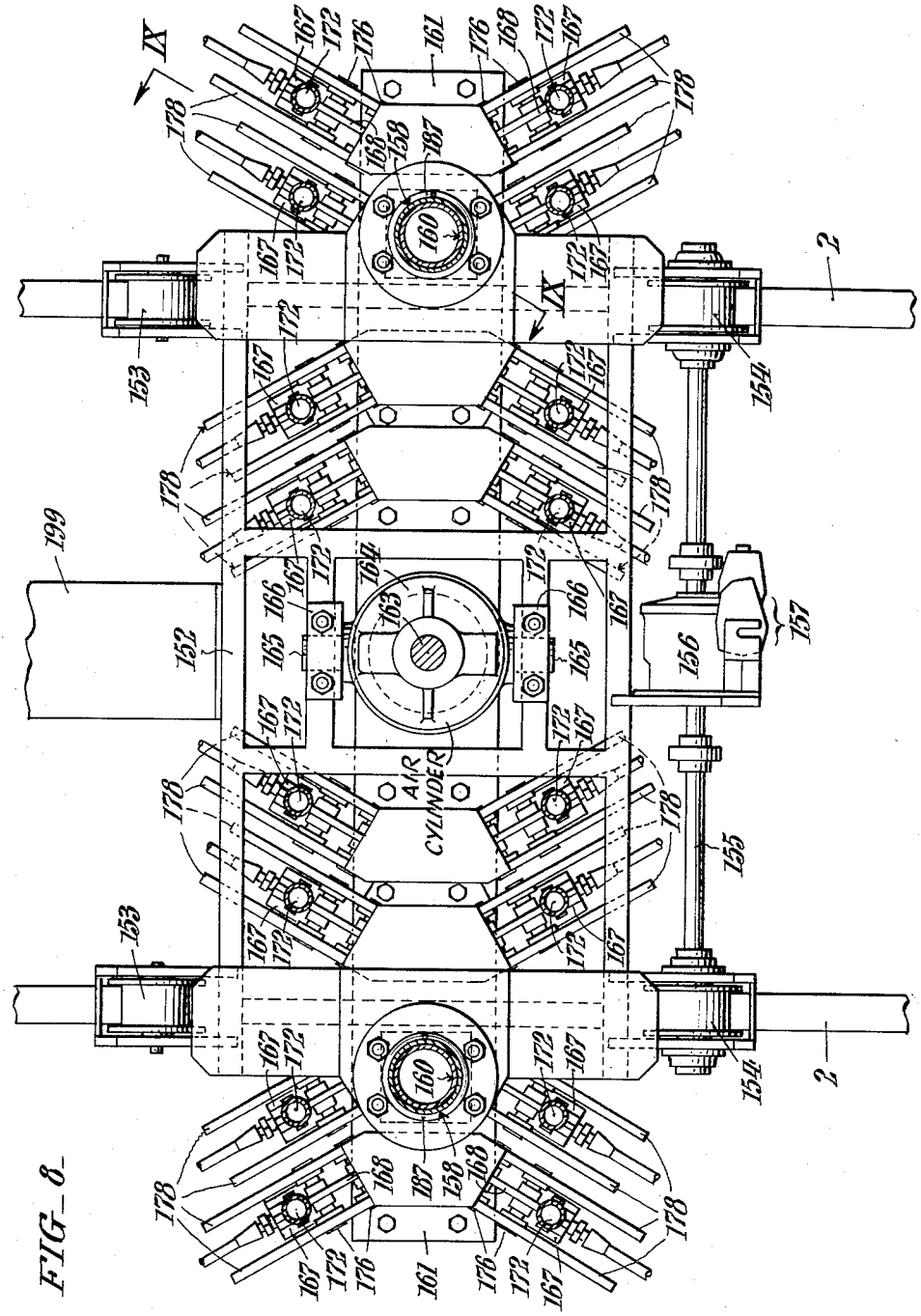

Feb. 14, 1956     S. R. HURSH ET AL     2,734,463
RAILWAY TRACK BALLAST TAMPING APPARATUS
Filed Oct. 5, 1950     20 Sheets-Sheet 8
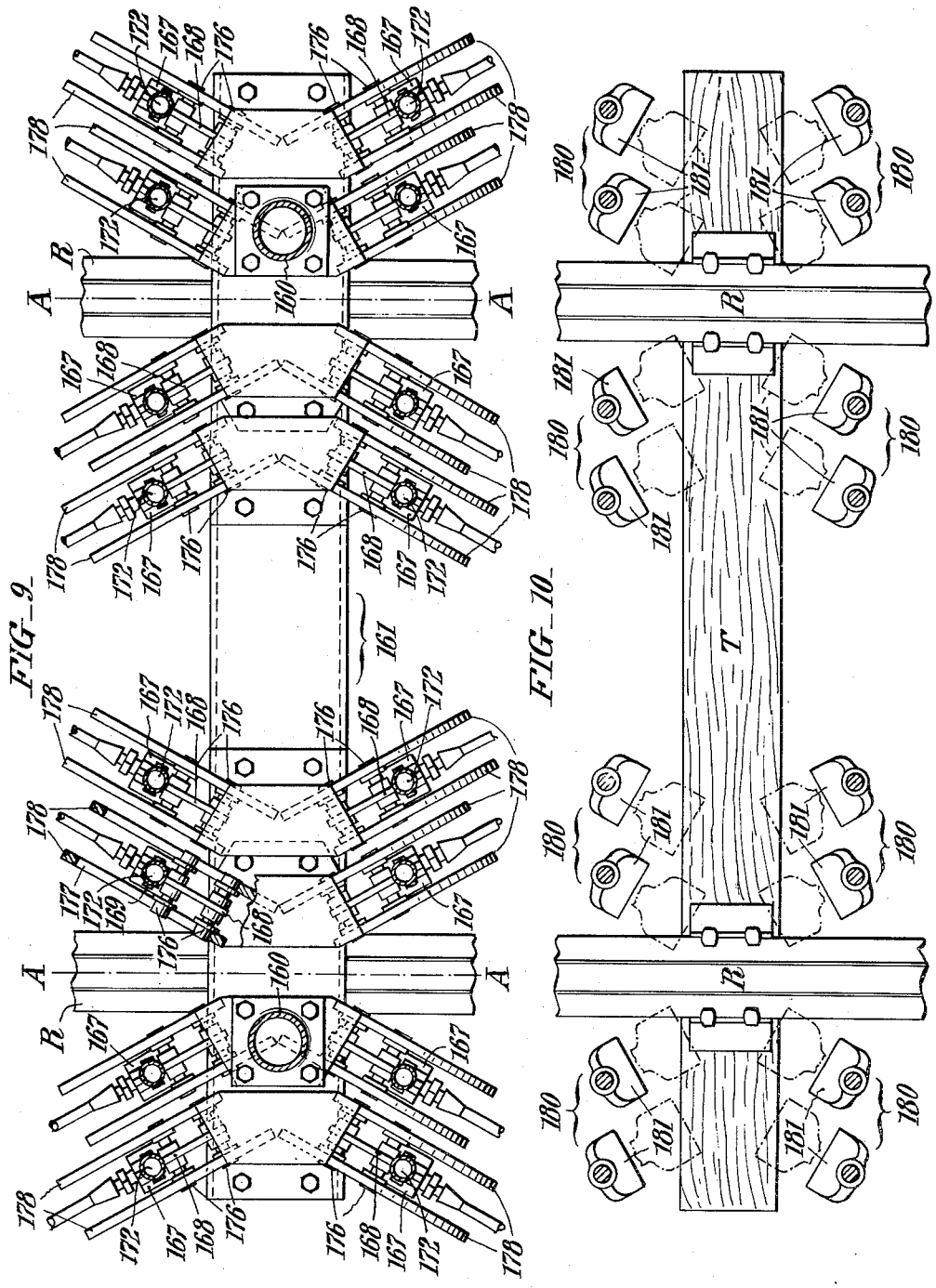
INVENTORS:
Samuel R. Hursh &
James B. McWilliams,
BY Paul & Paul
ATTORNEYS.

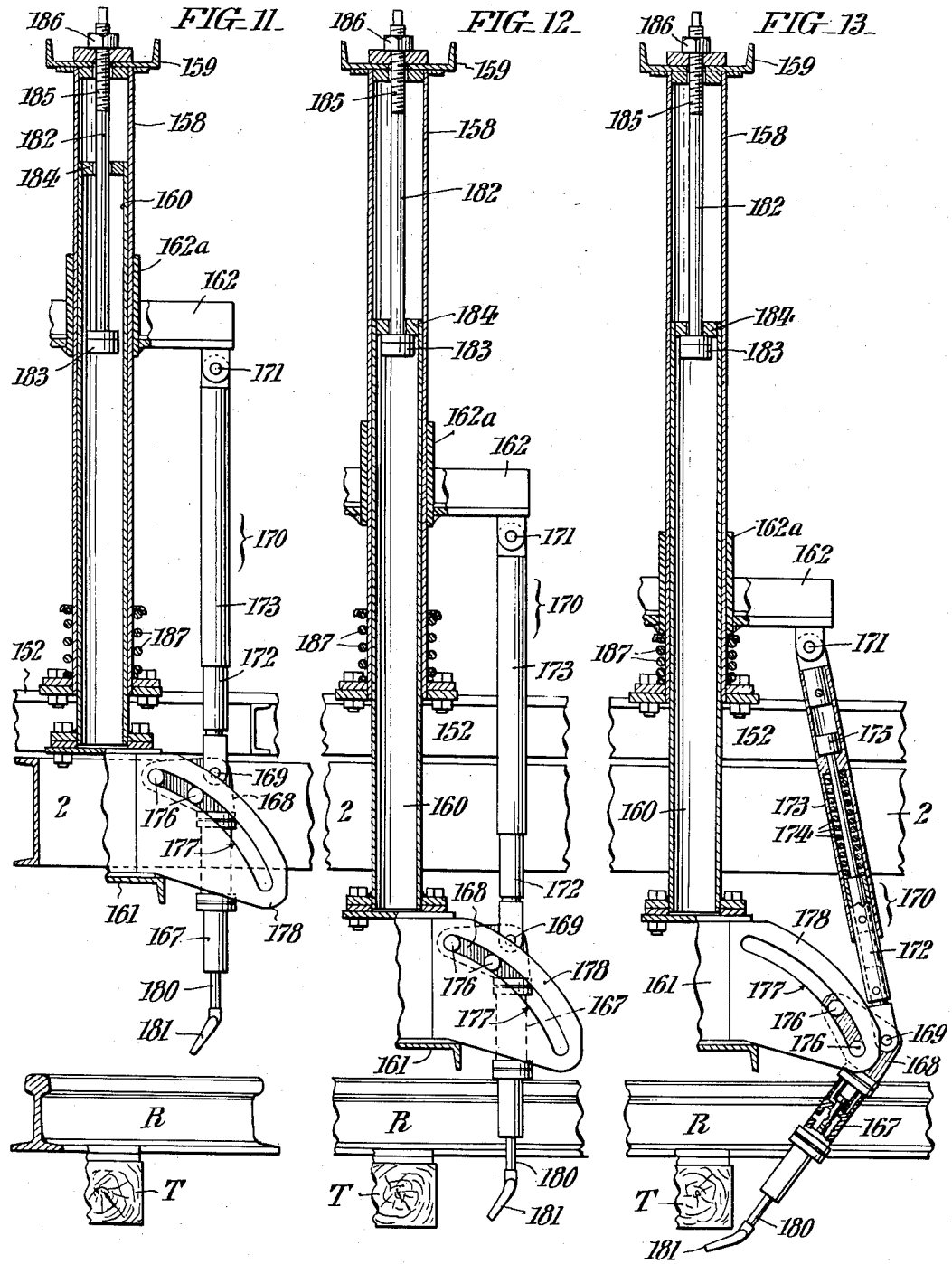

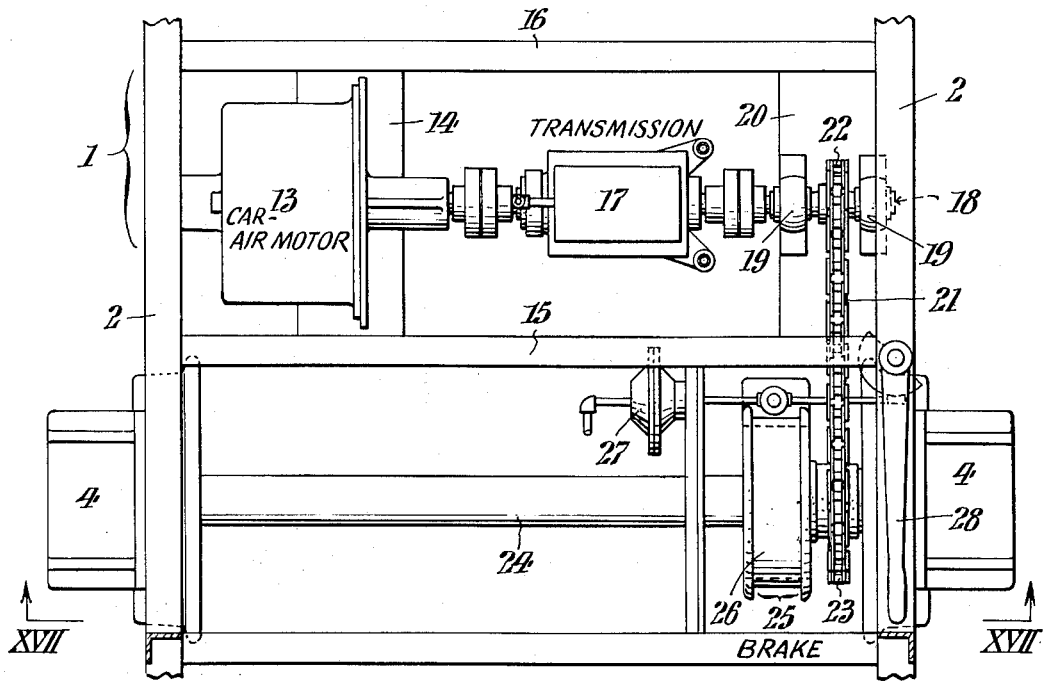
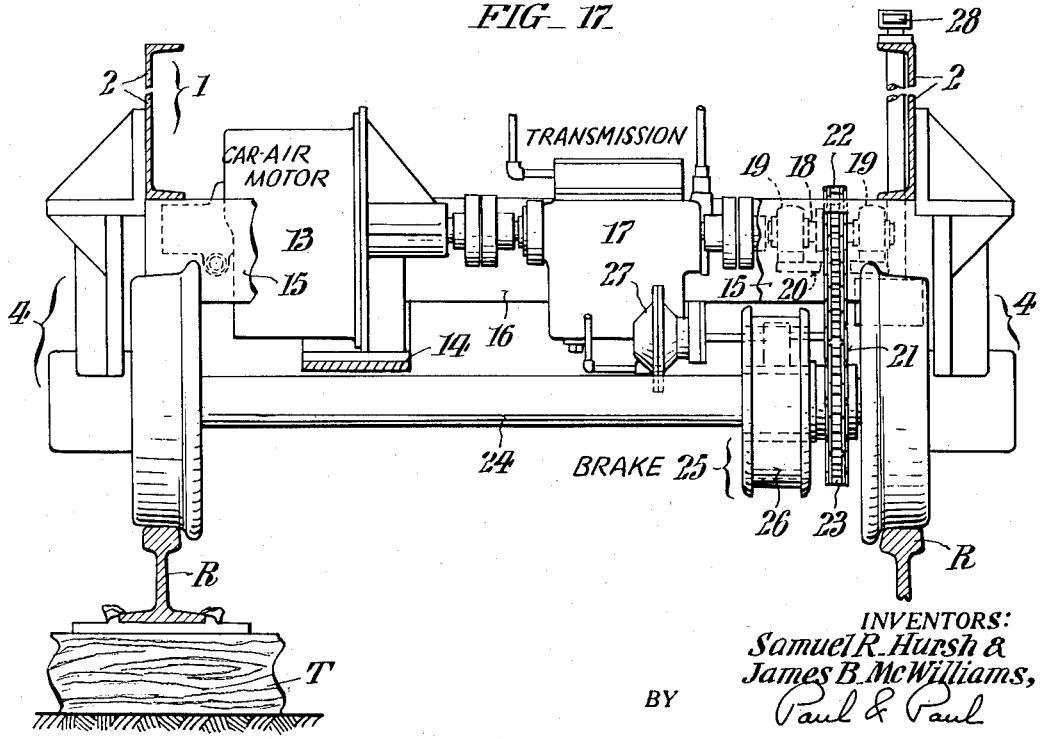

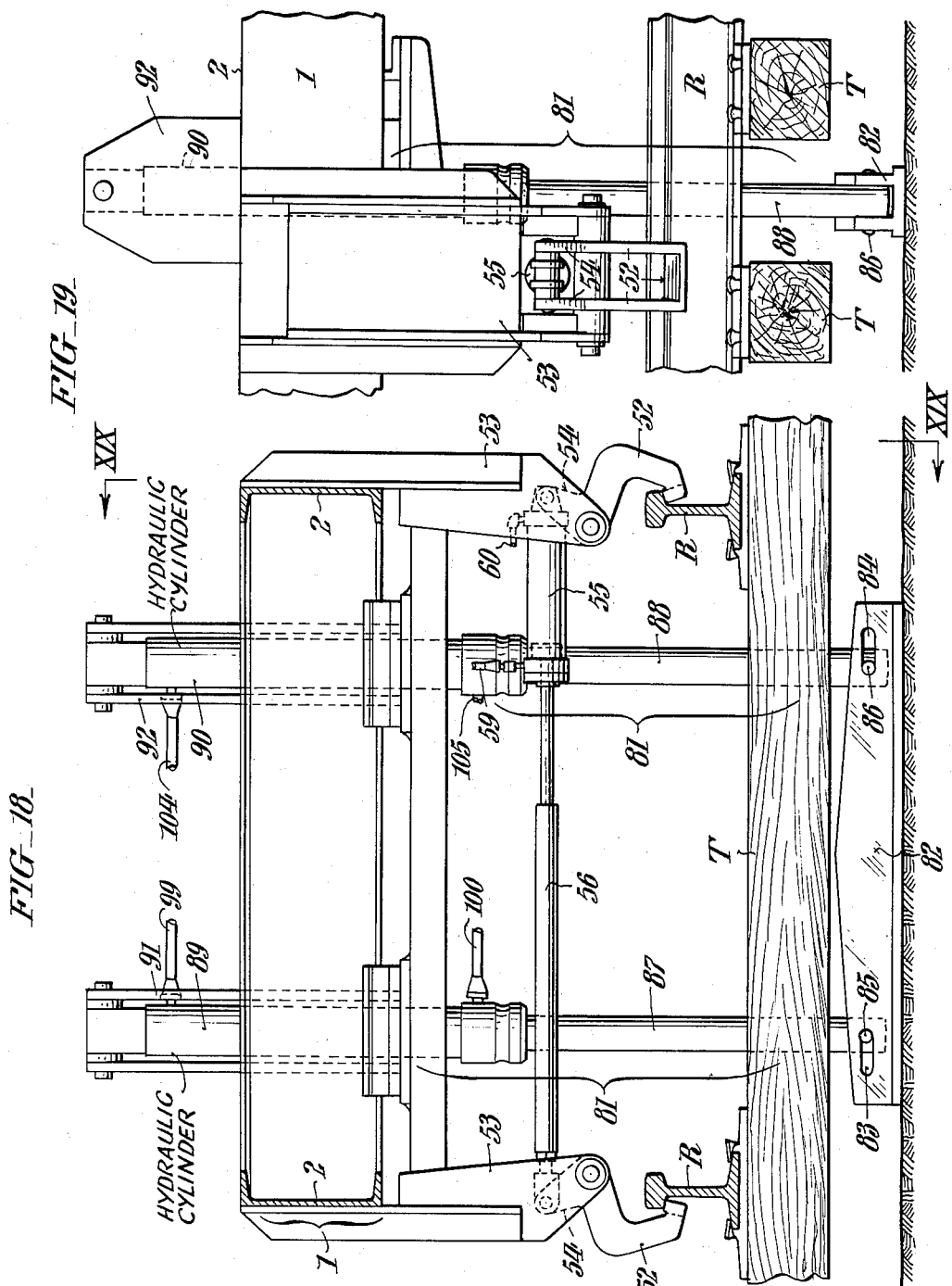

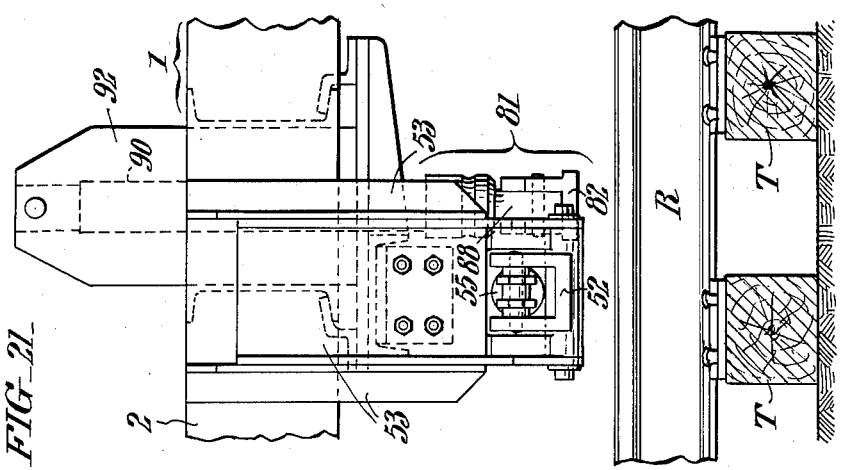
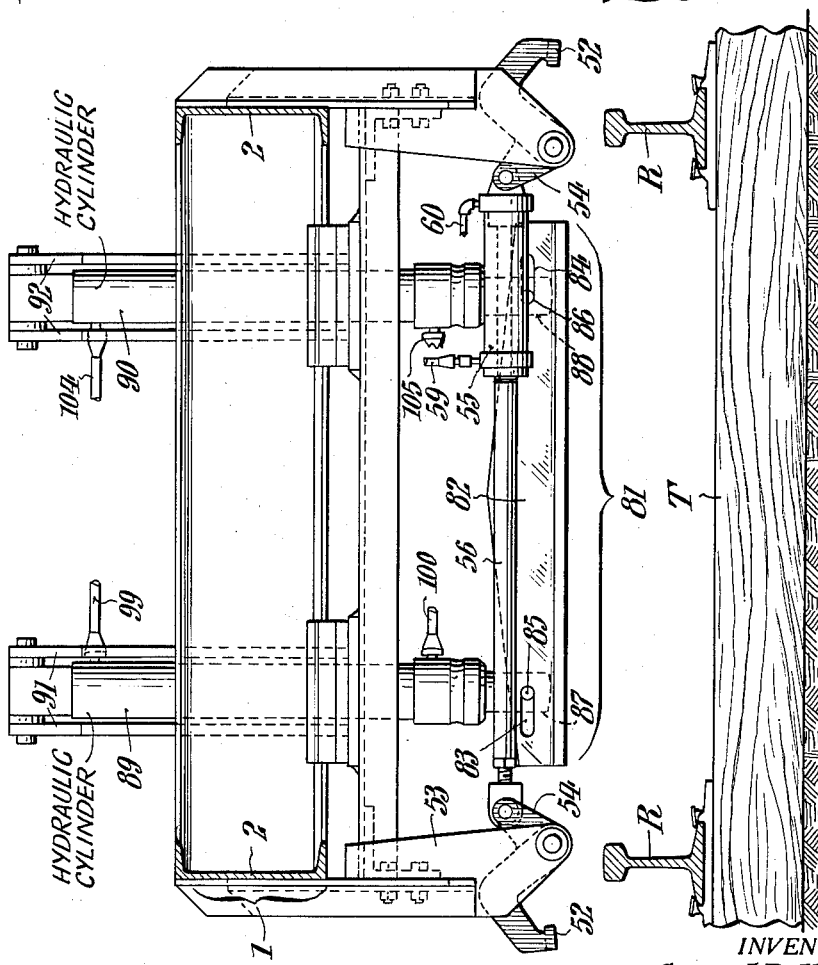

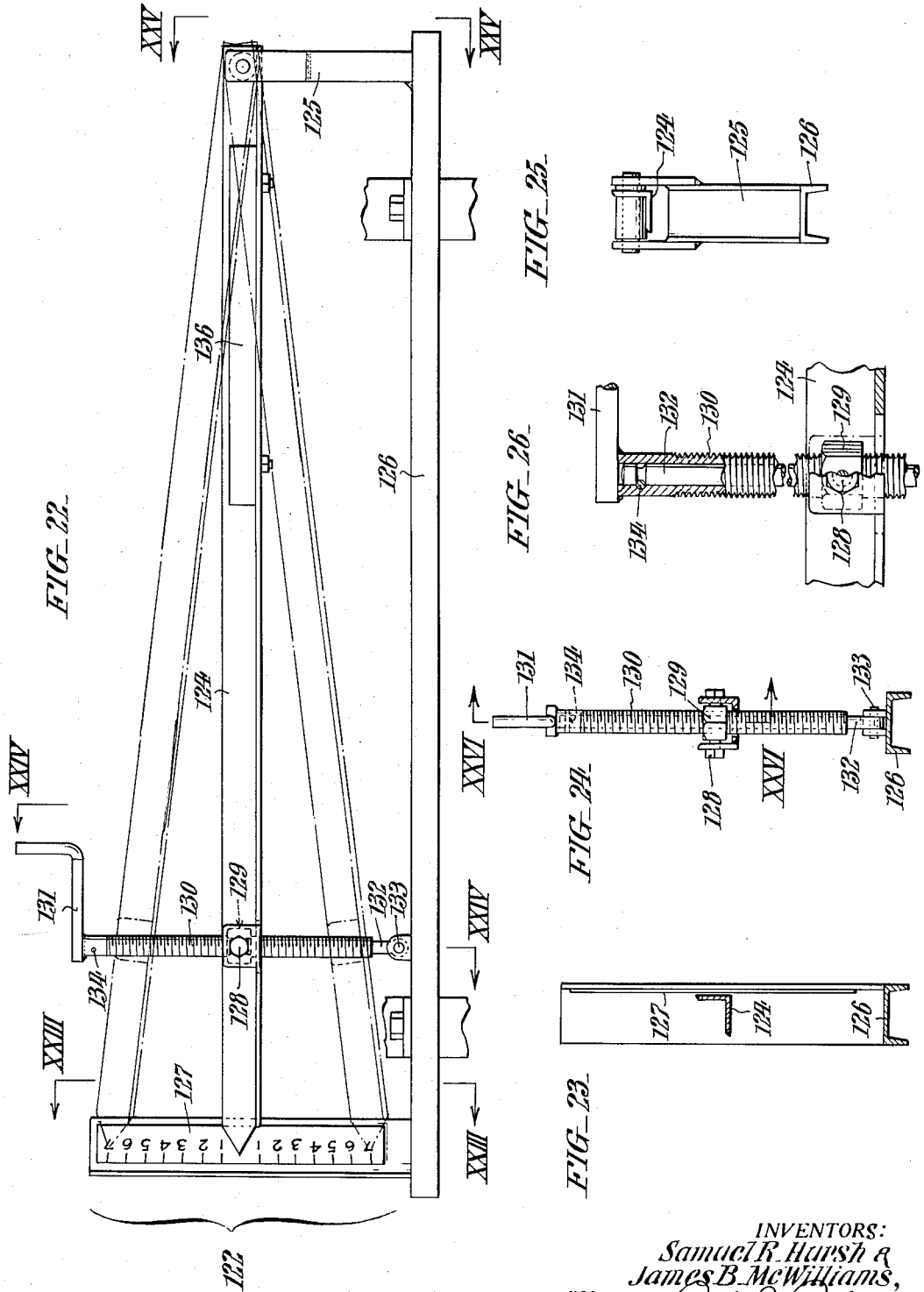

Feb. 14, 1956 S. R. HURSH ET AL 2,734,463
RAILWAY TRACK BALLAST TAMPING APPARATUS
Filed Oct. 5, 1950 20 Sheets-Sheet 14

INVENTORS:
Samuel R. Hursh &
James B. McWilliams,
BY Paul & Paul
ATTORNEYS.

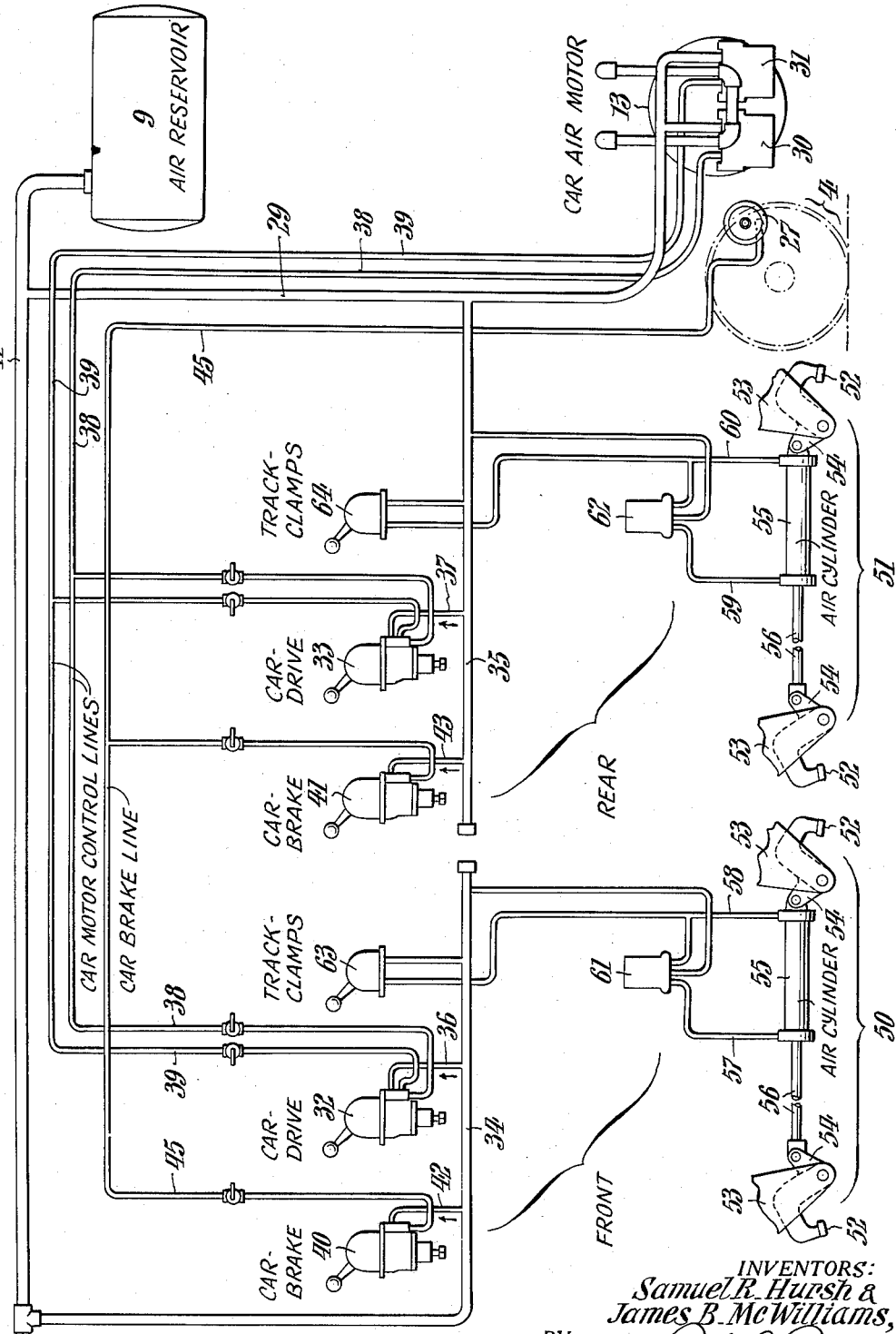

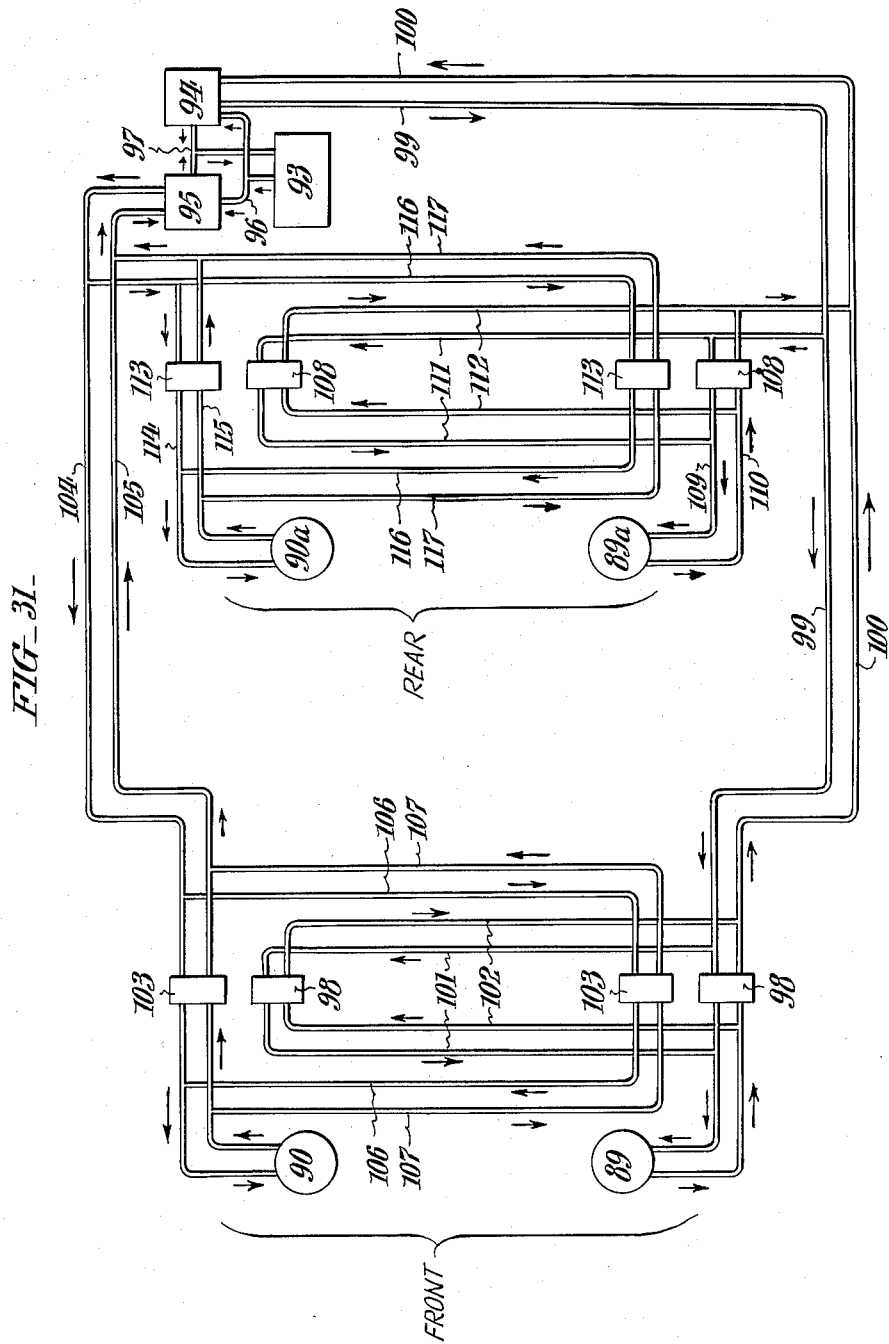

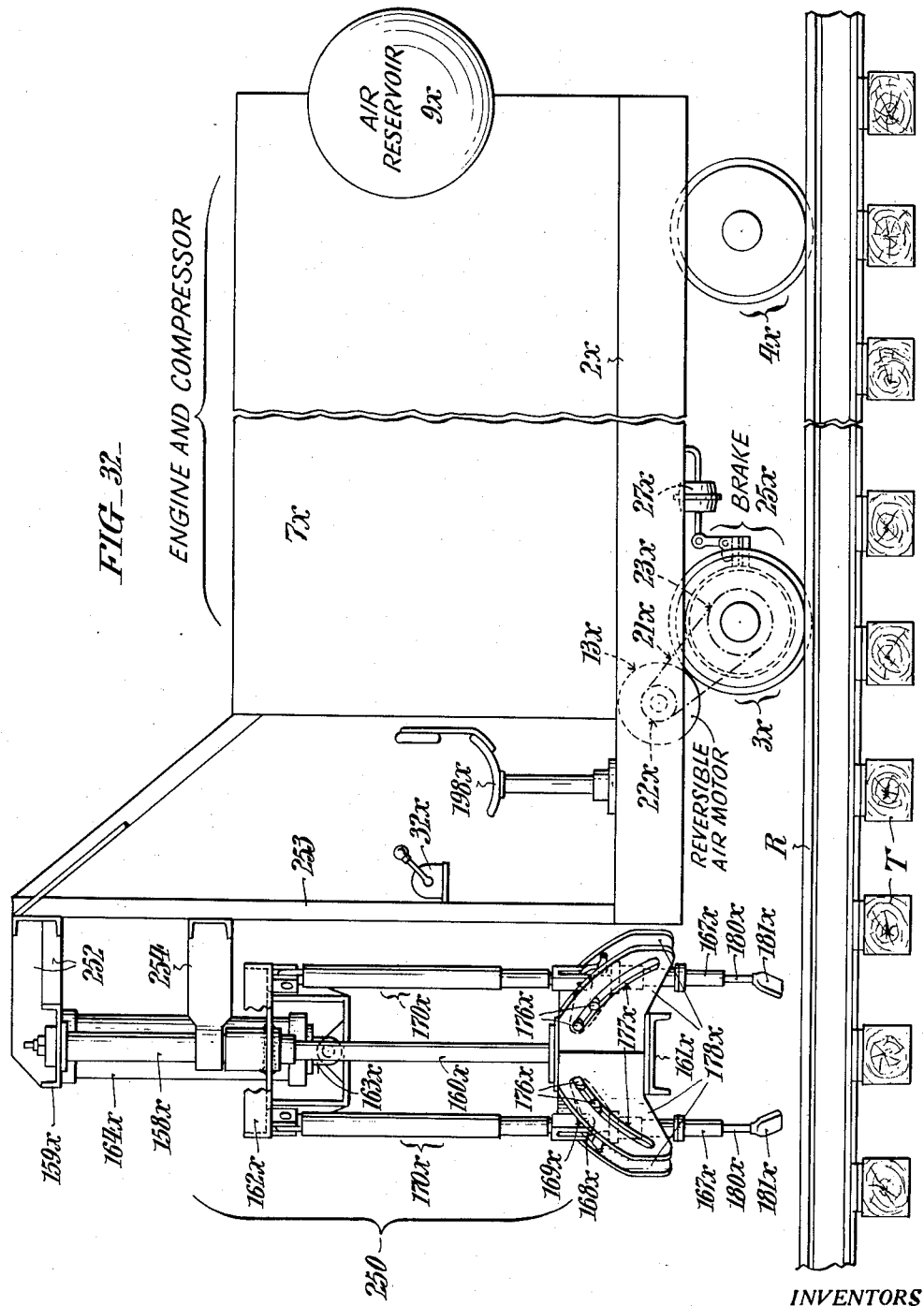

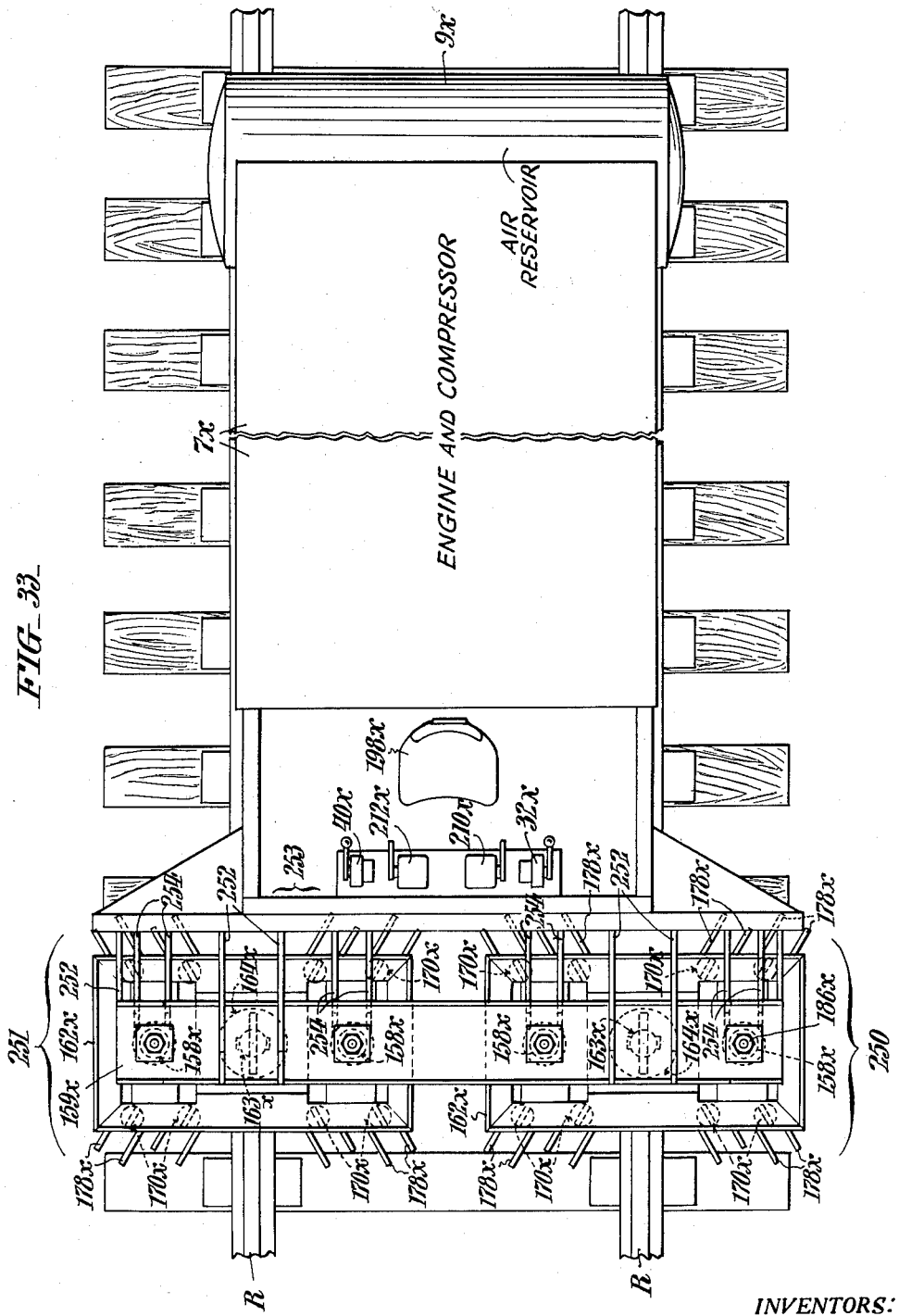

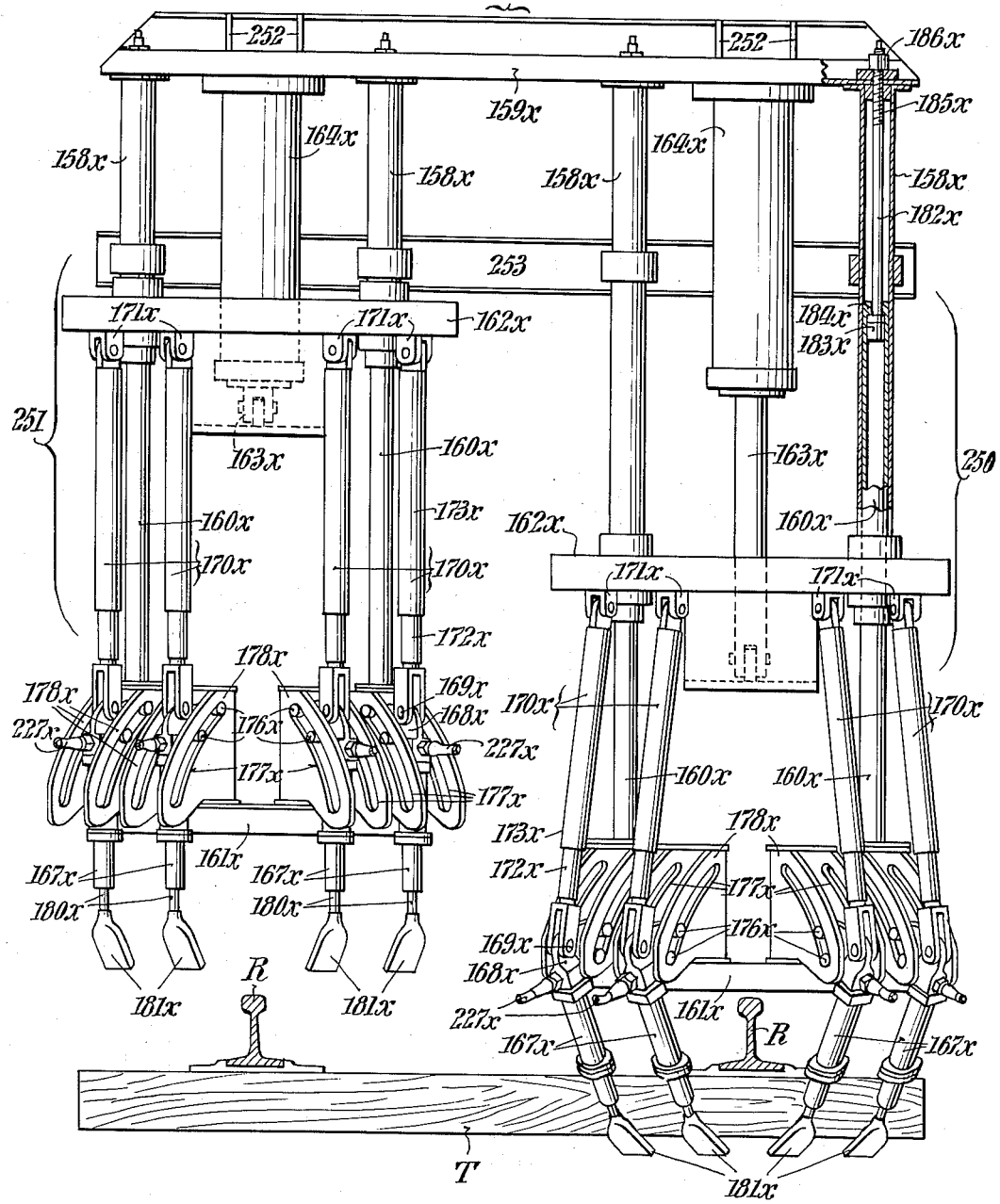

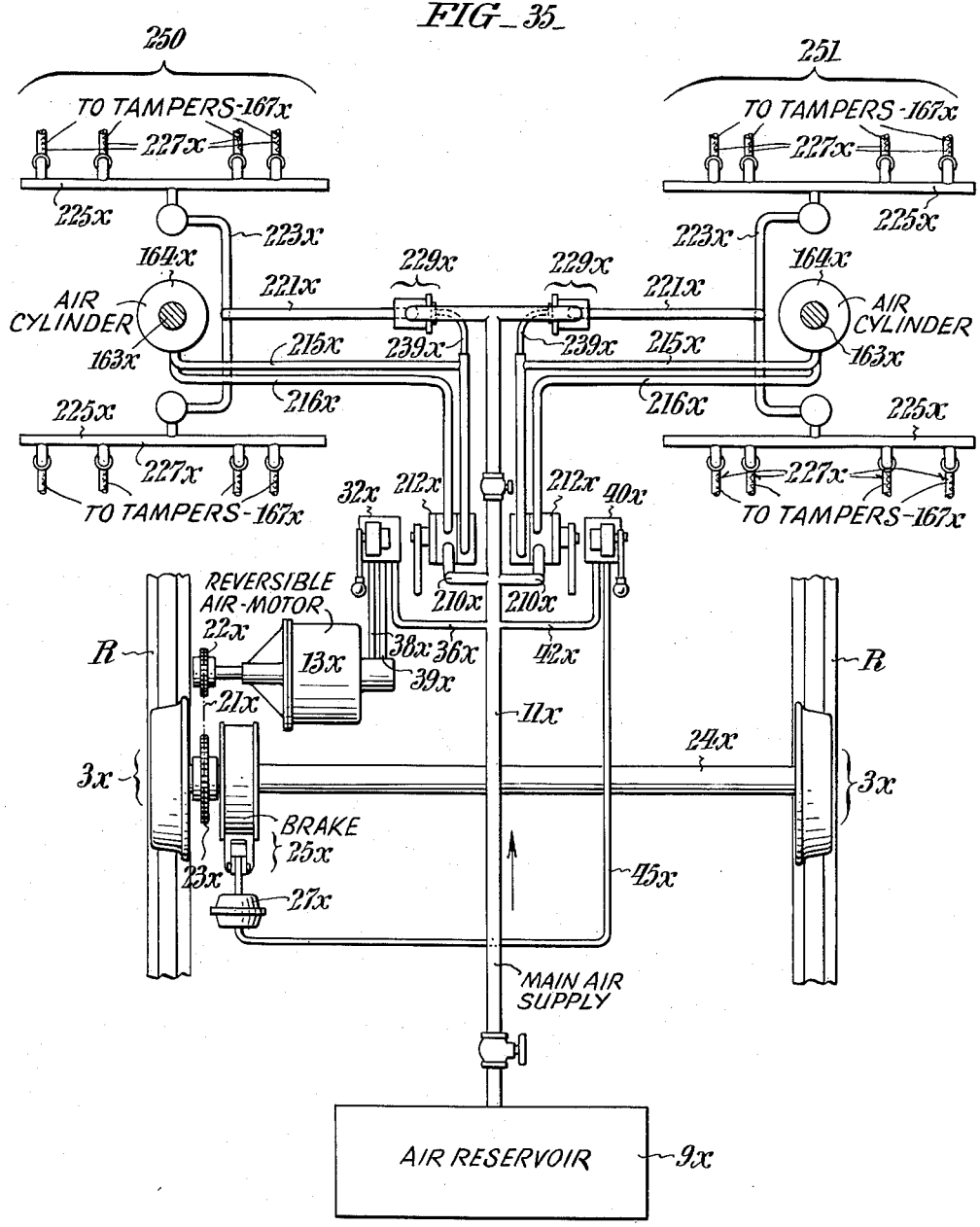

United States Patent Office 2,734,463
Patented Feb. 14, 1956

2,734,463

RAILWAY TRACK BALLAST TAMPING APPARATUS

Samuel R. Hursh, Bala Cynwyd, and James B. McWilliams, Pittsburgh, Pa.

Application October 5, 1950, Serial No. 188,494

41 Claims. (Cl. 104—12)

This invention relates to railway track ballast tamping apparatus. More particularly, it is concerned with apparatus generally of the type shown and described in U. S. Reissue Patent No. 23,687 granted to Samuel R. Hursh, one of the present applicants, and Clarence J. Reigh on July 21, 1953, for packing ballast stone beneath the rail ties from opposite sides as required from time to time in road maintenance, and for raising and holding existent track to a new level preparatory to tamping. In this prior apparatus a group of powered tampers is supported by a single carriage which is shiftable longitudinally of a self-powered wheeled car from tie to tie while the car is stationary on the track being operated upon. The car is equipped at opposite ends with manually-actuated rail gripping means, and also with manually-actuated jack means whereby it may be raised bodily to bring the gripped portion of the track within the length of the car to the desired new level and to so hold it until the tamping is done.

The chief aim of our invention is to enable track raising and tamping to be accomplished more rapidly, more accurately and more efficiently by a smaller crew than possible with the apparatus of the aforementioned prior application. This objective is realized, as hereinafter more fully disclosed, through provision of a car of such length as to accommodate thereon in line, several tamper carriages which are individually shiftable by power longitudinally of the car from tie to tie under manual control of operators seated on them in a position from which the tampers are at all times in full view, the track raising and holding being accomplished by improved manually-controlled pneumatically-actuated rail-gripping means in conjunction with improved manually-controlled hydraulic jack means, and the tamping being accomplished by power-operated percussion tampers of which there is a group or groups supported by vertically movable heads on each carriage and so arranged as to compact the ballast beneath individual ties concurrently from opposite sides in the regions of the rail support with a minimum of stone breakage. The heads are raised and lowered relative to the track bed during the tamping under manual control of the operators on the respective carriages; and by improved automatic means, power is supplied to the tampers only while lowered to prevent power wastage. As further hereinafter disclosed, leveling means are also provided on the car to enable levelling of tangent track as well as exact super elevation of each curved track portion within the length of the car before tamping is begun.

Other objects and attendant advantages of the invention will appear from the following detailed description of the attached drawings, wherein:

Fig. 1 is a view in side elevation showing how our improved apparatus is arranged for operation on railway track which is to be raised and tamped at a higher grade or super elevation.

Fig. 2 is a view like Fig. 1 with a length or section of the track supported at the new level in readiness for tamping of the ballast beneath the raised track.

Fig. 3 is a broken out view of the apparatus in side elevation drawn to a larger scale.

Fig. 4 shows the apparatus in top plan with the roof removed, the illustration actually being a horizontal section taken as indicated by the angled arrows IV—IV in Fig. 3.

Fig. 5 is a view in cross section drawn to a still larger scale and taken as indicated by the angled arrows V—V in Figs. 3 and 4 at one of the tamper carriages.

Fig. 6 is a view like Fig. 5 with the tampers lowered to operative position relative to the track bed.

Fig. 7 is a fragmentary view in side elevation looking as indicated by the angled arrows VII—VII in Fig. 5.

Figs. 8, 9 and 10 are horizontal sections taken as indicated respectively by the arrows VIII—VIII, IX—IX and X—X in Fig. 5.

Fig. 11 is a fragmentary view in section taken as indicated by the angled arrows XI—XI in Fig. 8 and showing one of the tampers in its raised inactive position.

Figs. 12 and 13 are views like Fig. 11 showing successive positions through which the tamper moves in being lowered.

Fig. 14 is a detail view in section taken as indicated by the angled arrows XIV—XIV in Fig. 5 showing a latch means by which the tampers are releasably locked in fully raised position when the apparatus is to be advanced on the track.

Fig. 15 is a view like Fig. 14 with the latch means retracted.

Fig. 16 is a fragmentary detail view in top plan taken as indicated by the angled arrows XVI—XVI in Fig. 3.

Fig. 17 is a detail view in cross section looking as indicated by the angled arrows XVII—XVII in Fig. 16.

Fig. 18 is a cross section taken as indicated by the angled arrows XVIII—XVIII in Fig. 3 and showing one of the track gripping and jack means.

Fig. 19 is a fragmentary view in side elevation looking as indicated by the angled arrows XIX—XIX in Fig. 18.

Figs. 20 and 21 are views corresponding respectively to Figs. 18 and 19 with the rail gripping means released.

Fig. 22 is a fragmentary view in cross section taken as indicated by the angled arrows XXII—XXII in Fig. 4 showing the gauging means provided for use incident to levelling the track on tangent or on curves where super elevation is required for tamping.

Figs. 23, 24 and 25 are detail views of the gauging means taken as indicated respectively by the arrows XXIII—XXIII, XXIV—XXIV and XV—XV in Fig. 22.

Fig. 26 is a fragmentary broken out view in section taken as indicated by the angled arrows XXVI—XXVI in Fig. 24.

Figs. 27 and 28 are fragmentary views in top plan at different elevations showing different portions of a piping system by which compressed air is conducted to the tamper carriages for raising and lowering and operating the tampers.

Fig. 30 is a diagrammatic view showing a piping system through which compressed air is conducted to the rail gripping means, a propelling motor and a brake means, and also the manual means by which the flow of the air to these various devices is controlled.

Fig. 31 is a diagrammatic view of the hydraulic piping system and the manual controls through which the track lifting means is operated and controlled.

Fig. 32 shows the side elevation of a modified embodiment of our improved track ballast tamping apparatus.

Fig. 33 shows the modified apparatus in top plan.

Fig. 34 shows the front end elevation of the modified apparatus; and

Fig. 35 is a diagrammatic view of the air piping system in the modification.

The car

Figure 28:
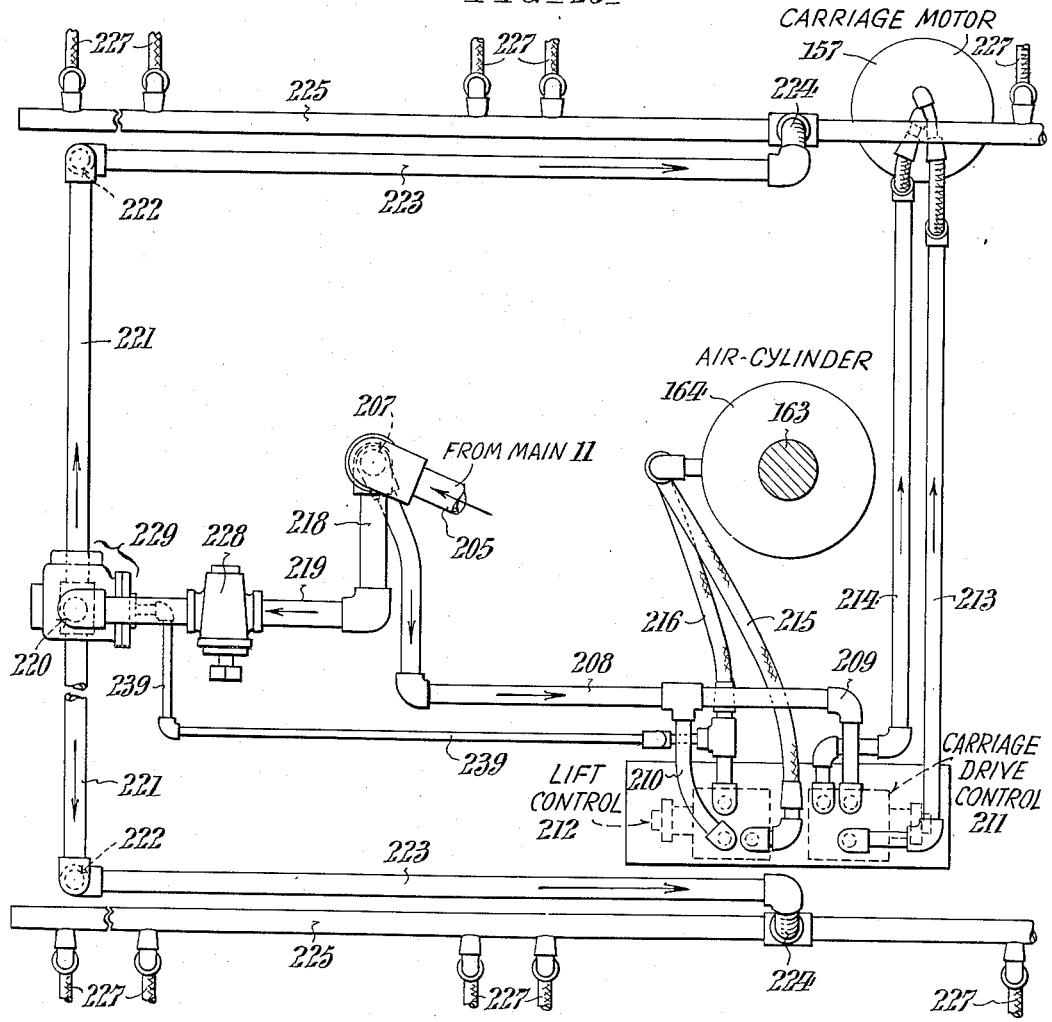

With reference first more particularly to Figs. 3–5, it will be observed that our improved tamping apparatus, as there shown, is in the form of a car having a frame 1 with full length laterally-spaced side longitudinals 2 which, at the front and rear ends, are supported by wheeled trucks 3 and 4 for mobility on the rails R of the railway track which is to be raised and tamped or surfaced. The car is also provided at its front and rear ends with auxiliary wheels 5 and 6 for use in running it laterally onto and off the railway track. As shown in Fig. 3, the car frame 1 extends to a substantial distance beyond the rear truck 4 to provide support for an air-compresser unit or other source of power generally designated 7. The unit 7 may be of any standard or commercially-available type wherein a compresser or other source of fluid pressure medium is driven by an internal combustion engine. For this reason, neither the compressor nor source of fluid pressure medium nor the prime mover are illustrated. Mounted over the unit 7 are a tank 8 for the engine fuel, and a compressed air storage reservoir 9, the latter receiving air from the compressor by way of a pipe 10, and delivering the air through a pipe main 11 which extends lengthwise of the car immediately beneath its protective roof 12. For the propulsion of the car, we have shown a rotary air motor 13, see Figs. 16 and 17, which is supported on a suspension 14 hung from two parallel cross members 15 and 16 of the car frame 1. Through an interposed speed reducing transmission 17, the air motor 13 drives a shaft 18 which rotates in fixed bearings 19 on a shelf 20 extending between the frame members 15 and 16. A chain 21 connects a sprocket pinion 22 on shaft 18 with a sprocket 23 affixed to the wheel axle 24 of the rear truck 4. Secured to the wheel axle 24 alongside the sprocket 23 is a brake drum 25 whereof the clamp band 26 is arranged to be operated by a pneumatic actuator 27. For safety purposes, we have shown a hand lever 28 with mechanical connections whereby the brake 26 may be operated manually.

Extending down from the air main 11 is a branch 29 that divides and connects into relay valves 30 and 31 (Fig. 30) which are relied upon to determine rotation of the air motor 13 in opposite directions. In order that the motor 13 may be controlled from either end of the car, we have provided the hand valves respectively indicated at 32 and 33 to which latter compressed air is conducted from the main 11 by way of other branches 34 and 35 and leads 36, 37, from said branches. As shown, the hand valves 32, 33 are connected in parallel with secondary pipes 38, 39 which respectively lead to the relay valves 30, 31. Thus upon movement of either of the hand valves 32 and 33 in one direction, the relay valve 30 is actuated for operation of the air motor 13 for forward propulsion of the car, and upon movement of either of said valves in the opposite direction, the relay valve 31 is actuated for reverse operation of the air motor and rearward propulsion of the car. The brake band 26 is similarly controllable by hand valves 40, 41 likewise respectively at opposite ends of the car, said valves receiving air from the branches 34, and 35 through leads 42, 43, and being connected in parallel to a secondary pipe 45 which extends to the brake actuator 27.

The rail gripping means

Rail gripping means are provided at opposite ends of the car immediately inward of the trucks 3 and 4, these means being generally designated 50 and 51 respectively in Fig. 3 and one of them being illustrated in detail in Figs. 18–21. These gripping means are identical in construction, each of them comprising a pair of hook elements 52 which are fulcrumed on suspension brackets 53 on the side longitudinals of the car frame, and which are adapted to engage beneath the heads of the track rails R from the outside as shown in Figs. 18 and 19. Pivoted to the upward arm projection 54 of one hook element 52 is a double-acting pneumatic cylinder 55 whereof the piston rod 56 is pivotally connected to a similar upward arm projection of the other hook element. Communicating into opposite ends of the actuating cylinders 55 (Fig. 30) of the respective gripping devices 50 and 51, are pipes 57, 58 and 59, 60 which lead from reversing relay valves 61 and 62, the latter being controlled through the medium of hand valves 63 and 64 respectively at opposite ends of the car. From Figs. 3 and 4, it will be observed that the hand valves 32, 40 and 63 are mounted on a shelf 70 within easy reach of a master operator's chair 71 on a platform 72 at the front end of the car, and the valves 33, 41 and 64 on a shelf 73 within easy reach of another master operator's chair 74 on a platform 75 at the rear end of the car.

The car jacking means

For the description of the car jacking means reference will be had to Figs. 3, 4, 18–21 and 31. This means comprises two similar mechanisms 80 and 81 which are respectively disposed at opposite ends of the car in close proximity to the rail gripping devices 50 and 51. As instanced in Figs. 18–21, each jacking mechanism comprises a foot piece in the form of a transversely-arranged bar 82 of channel cross section which is adapted to bear upon the road bed in the interval between a pair of track ties T. Adjacent opposite ends, the bar 82 has longitudinal slots 83, 84 which are loosely engaged by cross pins 85, 86 at the lower ends of the piston rods 87, 88 of two vertically arranged hydraulic cylinders 89, 90. As shown, the cylinders 89, 90 are pivotally suspended from the tops of fixed upstanding brackets 91, 92 on the car frame. The jacking mechanism 81 at the rear end of the car is identical to the mechanism 80. Accordingly, in order to obviate the necessity for repetitive description, all the component elements of the mechanism 81 having their counterparts in the mechanism 80 are identified with the same reference numerals previously used with the letter "a" added in each instance for convenience of more ready distinction. The pressure liquid (which may be oil) used in the actuation of the lift mechanisms 80 and 81 is contained in a small reservoir 93 (Fig. 3) at the rear end of the car adjacent the power unit 7, its flow being induced by two pumps indicated at 94 and 95 in Figs. 3, 4, and 31, the pump 94 serving for the cylinders 89, 89a, and the pump 95 serving for the cylinders 90, 90a. As shown in Fig. 31, the pumps 94, 95 have flow and return pipe connections 96, 97 respectively with the tank 93. Flow of the actuating fluid from the pump 94 to the lift cylinder 89 is controllable by reversible valves 98 of which there is one located at each frontal corner of the car as shown in diagrammatic Fig. 29, one of said valves being directly interposed in flow and return pipe mains 99, 100 leading from the pump 94, and the other of said valves interposed in branch pipes 101, 102 shunted across the first valve and connecting into said mains. Flow of pressure liquid from the pump 95 to the lift cylinder 90 is similarly controllable by reversible valves 103 of which there is one located at each frontal corner of the car alongside the corresponding valve 98. One of the valves 103 is directly interposed in flow and return pipe mains 104, 105 which lead from the pump 95 to the lift cylinder 90, and the other of said valves is interposed in branch pipes 106, 107 shunted across the first valve and connecting into said mains. Flow of pressure liquid to the lift cylinder 89a from the pump 94 is in turn controllable by reversible valves 108 of which there is one located likewise at each rear corner of the car. One of the valves 108 is interposed in branch pipes 109, 110 connecting into the mains 99, 100, and the other valve is interposed in shunting branch pipes 111, 112. The valves designated 113 respectively adjacent the valves 108 are provided for controlling flow of pressure liquid from the pump 95 to the lift cylinder 90a one of said valves being interposed in branch pipes 114, 115 connecting into the mains 104, 105, and the other valve 113 being interposed in shunting branch pipe 116, 117. The valves 98, 103, 108, 113 may be of any well known lever-operable commercial type and for this reason have not been illustrated in detail, and it is to be understood that the connections diagrammatically illustrated, are such that when said valves are in their normal neutral positions, any one of them is operable to control the flow of actuating fluid to the corresponding lift cylinder.

*The leveling means*

This leveling means includes telescopes 120 and 121 (see Figs. 1-3) respectively which are mounted on uprights at opposite ends of the car, and which are intended for selective use with a level rod such as shown at P in Figs. 1 and 2 as later on more fully explained. The leveling means further includes gauge devices 122 and 123 (Figs. 3 and 4) respectively at opposite ends of the car, these being disposed almost directly over the lift devices 80 and 81. As instanced in Figs. 22-24 each of the devices 80, 81 comprises a horizontal angle section pointer arm 124 which is pivoted at one end to a post 125 on a cross member 126 of the roof-supporting superstructure of the car, and which is coordinative with an upright graduated scale 127 also supported by said cross member. Held against turning within the angle hollow of the arm 124 adjacent the indicating end of the latter by transverse pivot studs 128 is a nut 129 which is in threaded engagement with a screw sleeve 130. As shown, this sleeve 130 has a hand crank 131 at the top whereby it may be rotated about an upright sustaining rod 132 pivotally connected at its lower end to the frame 126 member as at 133. Relative axial movement between the sleeve 130 and the rod 132 is prevented by a tangential cross pin 134 (Fig. 26) in the former which engages a circumferential groove 135 adjacent the top of the latter. A liquid level 136 mounted on the pointer arm 124, serves for a purpose later on explained.

*The tamper carriages*

Arranged for progression back and forth longitudinally of the car are two tamper carriages 150 and 151 which, except for being reversely arranged as will be seen from Figs. 1-4, are exact duplicates of each other. Each carriage (Figs. 5-8) comprises a frame 152 of structural steel which is rectangular in plan and provided with grooved wheels 153 and 154 to run on the side longitudinals 2 of the car frame. As shown, the wheels 154 are connected by an axle 155 arranged to be driven by an air motor 157 through the medium of a speed reduction unit 156. Upstanding from the frame of the carriage centrally of its opposite ends are tubular guide posts 158 which are connected at the top by a transverse channel beam 159; and telescopically engaging into said posts are hollow plungers 160 which extend upward from the corresponding ends of a cross head 161 (see Fig. 9) on the carriage at a level beneath the car frame 1. Guided for up and down movement on the posts 158 above the car frame is another cross head 162 which is connected at its mid point to the piston rod 163 of an upright pneumatic cylinder 164 with diametrical trunnions 165 (Figs. 5 and 8) engaged in bearings 166 on the carriage. Located adjacent each end of the lower cross head 161 is a group of eight tampers 167, four at each side of said cross head, whereof opposed pairs are symmetrically disposed at opposite sides of the vertical plane through the axis A—A of the corresponding track rail R as shown in Fig. 9. The tampers 167, are of the pneumatic percussion type and, except for certain features presently pointed out, may be of any well known construction. In accordance with our invention, the casing or body of each tamper 167 is provided at the top with a supporting fin 168 which is extended laterally as best seen in Figs. 11-13, and to which is pivotally connected at 169, the lower end of a thrust link 170, the upper end of the latter being similarly connected at 171 to the upper cross head 162. As instanced in Fig. 13, each link 170 is composed of two sections 172 and 173 of which the former is slidably engaged within the latter and yieldingly projected outward normally by a spring 174 as far as permitted by the stop indicated at 175. Extending from opposite sides of the fin 168 of each tamper 167 is a pair of spaced roller studs 176 which engage arcuate slots 177 in a pair of spaced parallel wing-like cam plates 178 projecting laterally from the lower cross head 161. From Fig. 9 it will be observed that the cam plates 178 for the respective pairs of the tampers 167 of the end group at each side of the lower cross head 161 are set at complemental acute angles to the plane A—A through the longitudinal axis of the corresponding track rail R, being thereby positioned more or less radial to the area of rail support of the tie. In accordance with our invention, the impact tool or bar 180 of each tamper 167 has a relatively wide blade end 181 which is curved or inclined inwardly with respect to the cross head 161. The lower cross head is limited in its descent by means including rods 182 (Figs. 11-13) which extend axially downward into the guide tubes 158 and plungers 160, and which have stop enlargements 183 at their bottom ends to react with the closure disks 184 at the tops of said plungers. For the purposes of individual axial adjustment as may be necessary for operation of the apparatus upon track with rails of different height, the stop rods 182 are threaded as at 185 and engaged by regulating nuts 186 which bear upon the beam 159. The compression springs shown at 187 tend to overcome any tendency of the sleeves 162a on the upper cross head 162 to bind on the guides 158 at the initiation of upward movement of said head.

During travel of the car over relatively long distances, the cross heads 161 and 162 are locked in fully raised position on the carriage with the tampers clearing the track as in Figs. 3, 5 and 7, by the means illustrated in detail in Figs. 14 and 15. As shown, this means includes a pair of self-releasing latch hooks 190 which are pivoted between ear lugs 191 at the bottom of the channel beam 159, and which are adapted to engage beneath the edge flanges of a bridge piece 192 connecting upstanding angle braces 192a at the top of the cross head 162. Upon slight rise of the bridge piece 192 and incidental clearing of the edge flanges thereof, the hooks 190 are swung outward out of the way as in Fig. 15 through downward pressure of a spring biased plunger 193 upon their inwardly projecting tails 194 to permit lowering of the crossheads 161 and 162 to operative position. One of the latch hooks has an actuating lever arm 195 from which a pull cord 196 is suspended. As shown in Fig. 7, the handle 197 on the pull cord 196 is within convenient reach of an operator when seated in a chair 198 supported on a platform 199 which is suspended by a bracket 200 from the carriage frame at one end thereof. To lock the crossheads 161 and 162 in elevated position, they are raised by admission of pressure fluid into cylinder 164 until the bridge piece 192 is at the level shown in broken lines in Fig. 15 whereupon, by pull of the cord 196, the latch hooks 190 are moved inwardly to engage beneath said bridge piece as in Fig. 14 as said crossheads are permitted to drop slightly upon subsequent exhausting of said cylinder. It is to be particularly noted that the chair 198 is so positioned that the tampers at all times are in full view of the operator when seated in the chair.

*Compressed air distribution pipe system*

Figure 29:
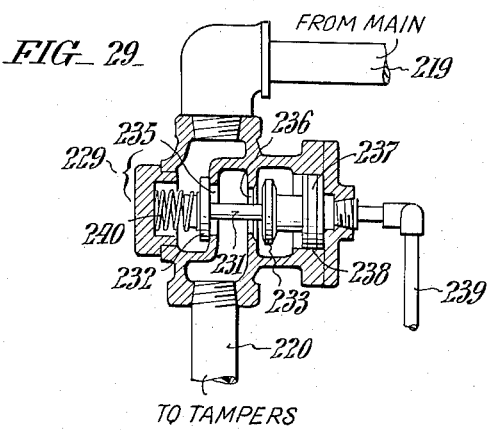
Fig. 29 is a fragmentary detail view in vertical section of an auxiliary or relay valve embodied in the piping system of Fig. 28.

Compressed air for actuation of the lift cylinders 164 of the two carriages 150, 151 is conducted through branch pipes with articulated sections 205, 206, Figs. 3, 4, 6, 7 and 27, 28, from the main 11. On each carriage 150 or 151, the swivel section 205 is connected by a drop branch 207 (Figs. 6-7) to a horizontal extension 208 from which separate leads 209, 210 extend to reversing hand valves 211, 212 affixed medially of one end of each carriage frame so as to be convenient of access to the operator seated in the chair 198. By means of the valve 211, it is possible to control flow of air, by way of pipes 213, 214, to the drive motor 157 for movement of the carriage in one direction or the other along the car frame as desired or required during the tamping. The hand valve 212 is utilized to selectively control air flow, by way of pipes 215, 216, to the top and bottom ends of the lift cylinder 164 on the carriage for either lowering the tampers to operative position during the tamping, or raising them clear of the track bed. The air for actuating the tampers 167 is conducted from the drop pipe 207, through intervening pipe connections 218, 219, 220, 221, 222 and 223, to manifolds 225 supported horizontally of opposite ends of the carriage by upstanding brackets 226 on the carriage frame, and from said manifolds through individual flexible hoses 227 to said tampers. Auxiliary equipment includes a shut off hand valve 228 which is interposed in pipe 219, and a three way automatic relay valve 229 at the juncture between pipes 219 and 220. As shown in Fig. 29, the relay valve 229 has a slide stem 231 which carries closure disks 232 and 233 for controlling two flow ports 235 and 236. Also on the stem 231 is a piston 237 which operates in a chamber 238 in communication, by way of a pipe 239, with the hand valve 212 as shown in Figs. 6 and 28. A spring 240 serves to keep the stem 231 of relay valve 229 normally positioned as in Fig. 29 with the port 235 closed, and with the port 236 open.

Operation

In preparation for the use of the apparatus, a definite amount of fresh stone ballast is spread over the bed of the track if it is to be elevated. The track is then raised at one point as shown in Fig. 1 to the new level, and hand jacks J inserted beneath opposite ends of one of the ties T at the rails R to establish a "run-off" level. With this accomplished, the car is run up until the wheels of the rear truck 4 rest upon the hump of the run-off, by manipulation of either the valve 40 or the valve 41. After setting of the brakes (Fig. 31), one of the valves 64 is operated to admit compressed air, by way of the pipe 60 into the cylinder 55 of the gripping 51 for actuation of the hooks 52 to engage beneath the heads of the rails R at the outsides after the manner shown in Figs. 18 and 19. The valves 108 and 113 (Fig. 32) of one of the four groups on the car are then manipulated for admission of fluid pressure into the tops of the hydraulic lift cylinders 89a, 90a for lowering of the foot bar 82 of the jack means 81 until it bears upon the track bed in the interval between a pair of the ties T. In the step just described, the valves 108 and 113 are individually operated as may be required for transverse leveling of tangent track or for providing super elevation of curved track as the case may be. In either case, the gauging means 123 at the rear end of the car is pre-set and used with the pointer bar 124 in zero position or in an angular position as indicated in broken lines in Fig. 22 depending upon the angularity and direction of super elevation carried on curved track. The valve 63 at the front end of the car is next manipulated for admission of air into the cylinder 55 of the gripping means 50 (Fig. 28) for actuation of the hooks 52 of said means to clamp the rails R and to hold the rails firmly to the wheels of the front truck 3 of the car. With the rails thus gripped, either pair of the valves 98, 103 at the front end of the car is manipulated for admission of actuating fluid into the upper ends of the lift cylinders 89 and 90 of the jacking means 50, as a consequence of which the foot bar 82 of said mechanism is lowered into engagement with the track bed in the interval between another pair of ties T and the front end of the car ultimately raised by continued admission of the fluid pressure into said cylinders. The extent to which the car front is to be raised is determined, as shown in Fig. 1, by use of the telescope 120 to spot markers M pre-set upon a level rod P placed on the track rails at the original level at an appropriate distance in advance of the car. In order to insure accurate transverse leveling of tangent track or super elevation of curved track, the leveling means 122 is employed during lifting of the front end of the car as just explained. All being now in readiness with a portion of the track within the length of the car held at the new level as shown in Fig. 2, the tamper carriages 150 and 151 are shifted along the car, the shifting being permitted due to the articulation of the air conducting pipes 205, 206 (Fig. 27), and accomplished under control of the valves 211 by the operators seated on them as already understood, until centered over one of the track ties. The cord 196 (Figs. 5–7) on each carriage is then pulled to withdraw the latch dog 190 for release of the cross head 162 from which the tampers 167 are suspended. After such release, the handle of valve 212 is thrown in one direction for admission of compressed air into the upper end of the cylinder 164, whereby the cross heads 161 and 162 are lowered together for a time and the tampers thereby moved toward operative position relative to the tie. After reaching the position of Fig. 12, the cross head 161 is arrested against descending further through engagement of the closure plugs 184 at the tops of the plunger tubes 160 with the stops 183 in the rods 182 as in Fig. 12, while the cross head 162 continues downward to the final position of Fig. 13. During this independent downward movement of the cross head 162, the tampers 167 at opposite sides of the plungers 160 are angled inwardly relative to the tie as shown in Fig. 13 and at the right of Fig. 3, through influence of the arcuate cam slots 177 of the wings 178 upon the studs 176 under thrust of the links 170. In this way, a certain amount of ballast is forced, by the tamper bits 181, beneath the tie from opposite sides in the regions of rail support due to the radial disposal of the tampers 167 and the cams 178. By repeated raising and lowering and constant impact of the tamper bits 181, more and more of the ballast is compacted under the tie to the desired firmness, incident to which the springs 174, in acting between the telescoped components of the thrust links 170, will yield if excessive resistance is encountered by the tamper bars and breakage of the latter and/or the stones reduced to a minimum. Compacting of the ballast is accordingly accomplished by a combined hammer blow and pressing action of the tamper bars.

From Figs. 6 and 29 it will be noted that upon admission of compressed air into the upper end of cylinder 164, some of the air flows to the relay valve 229 by way of the pipe 239. As a consequence, the disk 233 of valve 229 is shifted leftward from the position of Fig. 29, the port 236 being thereby closed and so held and the port 235 opened for supply of air through the pipes 220, 221, 223 and the manifolds 225 to the tampers 167. After sufficient ballast has been compacted beneath the tie, the handle of valve 212 is thrown in the opposite direction for admission of air into the lower end of the cylinder 164 and the cross heads 161 and 162 thereby raised with the tampers sufficiently high for clearance by the latter of the ties. In this action, the cross head 162 moves alone for a time at the start until the tampers 167 assume the vertical position of Fig. 12, whereupon the cross head 161 follows along until the tamper bits are clear of the ties, as in Fig. 11. During the raising of the tampers as just explained, air flow through the tube 215 and the pipe 239 (Figs. 6 and 28) is cut off, with consequent exhausting of the lower end of cylinder 164 and restoration of the relay valve 229 to the normal position of Fig. 29 by the spring 240. Air is therefore supplied to the tampers only during descent of the cross head 161, with consequent avoidance of wastage and increase in the efficiency of the apparatus. After the ballast has been compacted beneath one tie, the carriage is shifted along the car until centered over the next tie, and the tampers 167 again lowered and operated as before. While the tamping of the ballast may be started with the carriages 150 and 151 at opposite ends of the car as in Fig. 1 and the carriages shifted toward each other from tie to tie, it is preferable to start with them at one end of the car as in Fig. 2 and progressively shifting them in the same direction toward the opposite end of the car as the work proceeds. In the illustrated instance, the car is of such length as to enable twelve ties to be tamped at each operation, six ties by each operator. The car may of course be made longer or shorter as found convenient or desired, the length being limited only by minimum radius of curved track employed on the road. After one raised portion of track has been completely tamped, the bars 82 of the jacking means 80 and 81 are retracted and the clamps 52 of the gripping means 50 and 51 withdrawn, the car is advanced under power to a new position immediately beyond the portion of the track last tamped. The new portion of the track is thereupon gripped by actuation of the gripping means 50 and 51, and bodily raised to the new grade with the car by actuation of the jacking means 80 and 81, whereupon the tamping is carried out as before.

The modified embodiment of our invention illustrated in Figs. 32–35 is designed for use in tamping only, and is devoid of the rail gripping, jacking, and leveling means described in connection with the first embodiment. Here the car is considerably smaller, i. e. just long enough to carry the power unit 7x, with reservation of a small platform at the front end for an operator's chair 198x. Moreover, in this instance, the tampers 167x are divided into two groups 250 and 251 which are independently operable and centered over the respective rails R as will be seen from Figs. 33 and 34. The tampers of each such group are suspended from a cross head 162x by means of thrust rods 170x like those of the first embodiment, and constrained by cam wings 178x on a lower independently-movable cross head 161x whereof the plungers 160x telescopically engage upwardly into the tubular guides 158x by which the upper cross head 162x is guided in its up and down movements. In this alternative embodiment moreover, the guides 158x are secured at their upper ends to the transverse channel beam 159x which is fixedly supported by forward reaching members 252 of an upright frame 253 of structural steel at the front end of the car. Additional support is given to the guides 158x at the bottom by supplemental brace members 254 which extend forwardly from the frame 253 at a level below the members 252. The independent downward movement of the lower cross member 161x is limited, as in the first embodiment, by stop enlargements 183x at the bottom ends of rods 182x axially within the tops of the guides 158x as instanced at the right of Fig. 34. For controlling the flow of compressed air to the lift cylinder 164x of each tamper group 250, 251 is a reversible hand valve 212x (Fig. 35) which is in communication, through a branch pipe 210x with a main 11x leading from the supply reservoir 9x, and from which pipes 215x and 216x extend to the upper and lower ends of the cylinder 164x. Also, as in the first embodiment, air is supplied to the tampers 167x as they are lowered by actuation of an auxiliary or automatic relay valve 229x which is interposed in a branch 221x of the piping leading to the manifolds 225x and which is connected for actuation by a pipe 239x, with the pipe 215x extending to the cylinder 164x. The hand valves 212x for individually controlling the two tamper groups 250, 251 are mounted, as shown in Fig. 33, on the upright structural frame 253 at the front of the truck in convenient reach of the operator when seated in the chair 198x. Positioned at opposite sides of the valves 212x, are hand valves 32x and 40x for respectively controlling the air motor 13x by which the car is propelled on the track rails, and the brake 25x. Here again, in order to obviate the necessity for repetitive description, all other elements of the modification having their counterparts in the first described embodiment, are identified by the same reference numerals previously employed with addition, in each instance, of the exponent "x."

From the immediately foregoing, it will be apparent that the operation of the tampers is exactly the same as in the first embodiment, in that by their opposing radial arrangement in the respective groups, the ballast stones are compacted beneath the ties T toward the regions of rail support. The modified apparatus is intended more especially for use for surfacing purposes in instances where the track has been raised by separate jacks, for spot tamping of low joints, or surfacing where a general raise is not being made. In such instances it is often necessary to do more tamping under one rail than under the other rail. The modified apparatus is also particularly adapted to carrying out what is ordinarily known as "skip tamping" where one joint on one rail is tamped with the next joint on the opposite rail. In all cases, it is of course essential that there be the proper density of ballast beneath both joints at each tie, so that in the event of unequal distribution of ballast on the road bed, it may require a greater number of strokes of the tampers at one rail than at the other to insure that the packing of the ballast under both joints is uniform. The modified apparatus is thus admirably adapted for these special purposes and is furthermore advantageous from the standpoint of its small size, its greater simplicity, and its ability for management by but one operator, in shifting the car as a whole to position the tampers centrally over successive ties, as well as in controlling the functioning of the tampers. It is of course to be understood that if desired, the tampers on the individual carriages 150, 151 of the first embodiment may be subdivided into two independently controllable groups as in the modification.

We do not consider ourselves limited to the precise details of construction and arrangement nor to the precise forms of instrumentalities employed in the control system herein disclosed by way of example, since these are subject to considerable variation and modification within the scope of the broader of the appended claims as will be readily understood by those versed in the art of railway construction and maintenance.

Having thus described our invention, we claim:

1. In railway track ballast tamping apparatus, a car having wheels for mobility on the track; a plurality of pneumatically-actuated percussion tampers for compacting ballast beneath the ties; a normally-raised support guided for up and down movement on the car; means connecting the tampers individually to the support; means for lowering the support to bring the tampers into operative position relative to the track bed; and spring cushioning means embodied in the connecting means aforesaid, permitting the tampers to yield individually in the event of abnormal resistance of the ballast stones to being compacted beneath the ties by the hammering and compressing action of the tampers, whereby the pressure exerted by the individual tampers is equalized to effect uniform tamping.

2. In railway track ballast tamping apparatus, a car having wheels for mobility on the track; a plurality of pneumatically-actuated percussion tampers for compacting ballast beneath the ties; a normally-raised support guided for up and down movement on the car; means connecting the tampers individually to the support; means for lowering the support to bring the tampers into operative position relative to the track bed; means for automatically directing the tampers inwardly, when lowered to operative position, for entry of their bars under the ties; and spring cushioning means embodied in the connecting means aforesaid permitting the tampers to yield individually in the event of abnormal resistance of the ballast stones to being compacted beneath the ties by the hammering action of the tampers.

3. In a railway track ballast tamping apparatus, a car having wheels at opposite ends for mobility on the track rails; a plurality of percussion tampers for compacting ballast beneath the ties; a normally raised cross head guided for up and down movement on the car; vertically-arranged suspension rods pivotally connected at their upper ends to the cross head and similarly connected at their lower ends to the individual tampers; means for lowering the cross head to bring the tampers into operative position relative to the road bed; and cam means having arcuate cam slots engaged by projections on the tampers by which the tampers are individually directed inwardly upon reaching active position for positive thrust of their tamping bars beneath the ties.

4. In railway track ballast tamping apparatus, a car having wheels for mobility on the track rails; a plurality of tamping devices with elongate bodies, and with percussion bars for compacting ballast laterally beneath the ties; a normally-raised cross head guided for up and down movement on the car; vertically-arranged suspension rods pivotally connected at their upper ends to the cross head and similarly connected at their lower ends to the tops of the individual tampers; a second cross head guided for up and down movement independently of the first cross head; wing projections on the second cross head with arcuate cam slots engaged by lateral studs at the upper ends of the bodies of the individual tampers offset from the pivots of the latter; means whereby the two cross heads are lowered for a time together to bring the tampers into operative relation to the track bed; and means for thereafter arresting the second cross head, so that upon further descent of the first cross head, the tampers are directed inwardly by camming action of the wing projections for thrust of the tamper bars beneath the ties.

5. In railway track ballast tamping apparatus, a car with wheels for mobility on the track rails; a pair of laterally-spaced upstanding columns on the car; a cross head guided for up and down movement by the columns; a second cross head below the first with upstanding members affixed thereto and slidably guided by said columns; a plurality of percussion tampers for compacting ballast beneath the ties; suspension thrust rods pivotally connected at their upper ends to the upper cross head and similarly connected at their lower ends to the individual tampers; cam means on the lower cross head effective upon the tampers to direct them inwardly for entry of their bars beneath the ties when actively positioned; means for lowering the two heads together for a time to bring the tampers into active position relative to the track bed; and means for thereafter arresting the second cross head so that, upon further descent of the first cross head, the tampers are directed inwardly relative to the ties under the influence of the aforesaid cam means.

6. Railway track ballast tamping apparatus, according to claim 5, wherein the upstanding columns on the car are connected at the top by a transverse beam; and further including latch means on the beam for engaging the upper of the two cross heads to hold the latter and the lower cross head fully elevated with the tampers clearing the track bed during travel of the car.

7. In railway track ballast tamping apparatus, a car with wheels for mobility on the track rails; a pair of laterally-spaced columns on the car; a normally-raised cross head apertured for guidance to up and down movement by the columns; a plurality of percussion tampers supported from the cross head for compacting ballast beneath the ties; and means for lowering and raising the cross head to bring the tampers to operative position to the track bed during the tamping, including a vertically-arranged cylinder with its piston rod extending through the top thereof and connected to the cross head; and reversible manual valve means for controlling admission of fluid pressure selectively into the upper and lower ends of the cylinder.

8. Railway track ballast tamping apparatus, according to claim 7, further including latch means for holding the cross head fully raised with the tampers clearing the track bed during travel of the car.

9. In railway track ballast tamping apparatus, a car with wheels for mobility on the track rails; a support movable up and down on the car; a plurality of pneumatically-actuated percussion tampers for compacting ballast laterally beneath the ties of the track; and cushioned means whereby the tampers are individually connected to the support with capacity to yield independently in the event of abnormal resistance of the ballast stones to being forced under the ties by the hammering action of the tampers.

10. Railway track ballast tamping apparatus, according to claim 9, wherein the tampers are arranged for opposed action upon the ballast from opposite sides of the track ties.

11. Railway track ballast tamping apparatus, according to claim 9, wherein the tampers are positively guided for opposed action upon the ballast from opposite sides of the track ties and arranged in groups angled toward the regions of rail support.

12. In railway track ballast tamping apparatus, a car having a frame with spaced side longitudinals, and wheels at opposite ends thereof for mobility on the track; a carriage guided for movement along the car frame between trucks from a position over one track tie to position over another; reversible power means for propelling the carriage; powered percussion tampers supported from the carriage for compacting ballast beneath successive ties; and a chair on the carriage permitting a seated operator to observe the action of the tampers, separate manual control means convenient of access to the operator seated on the carriage for controlling the carriage propelling means and the tampers respectively.

13. In railway track ballast tamping apparatus, a car having an open frame with wheels at opposite ends for mobility on the track rails; a plurality of percussion tampers for compacting ballast beneath the ties of the track; a carriage shiftable longitudinally of the car frame from which the tampers are supported; means on the carriage for raising and lowering the tampers relative to the track bed during the tamping; a chair on the carriage from which a seated operator can observe the action of the tampers; and manual means convenient of access from the chair for controlling the raising and lowering means and for controlling the action of the tampers.

14. In railway track ballast tamping apparatus, a car with wheels for mobility on the track; two groups of powered tampers respectively adapted to pack ballast beneath the ties in the regions of rail support; separate supports for the individual groups of tampers guided for vertical movement on the car; separate means for so moving the supports; a chair on the car from which the action of the tampers can be observed by a seated operator; and manual means convenient of access from the chair for individually controlling the support moving means to raise and lower the corresponding tampers during the tamping.

15. In railway track ballast tamping apparatus, a car with wheels for mobility on the track; two groups of pneumatically-actuated percussion tampers adapted to pack ballast beneath the ties in the regions of rail support; separate supports for the respective tamper groups separately guided for independent up and down movement on the car; cushioned means connecting the tampers individually to the supports with capacity to yield in the event of abnormal resistance of the ballast stones to being compacted beneath the ties by the hammering and compressing action of the tampers; and separate means whereby the supports of the two tamper groups can be individually lowered and raised during the tamping.

16. Railway track ballast tamping apparatus according to claim 15, wherein the tampers of the respective groups are radially disposed and arranged for operation from opposite sides of the ties.

17. In railway track ballast tamping apparatus, a car with wheels for mobility on the track, two groups of pressure fluid powered hammer bit percussion tampers respectively adapted to pack ballast beneath the ties in the regions of rail support; supports for the respective tamper groups guided for independent up and down movement on the car to raise and lower the tampers relative to the track bed during the tamping, each such support comprising a cross head, vertically arranged suspension rods pivotally connected at their lower ends to the individual tampers, a second cross head below the first having wings thereon with arcuate slots engaged by lateral projections offset from the pivots at the tops of the individual tampers, stop means operative after the two cross heads have been lowered for a time together, to arrest the lower cross head so that upon somewhat further descent of the upper cross head, the tampers are angled inwardly about their pivots by the action of the cam wings for thrust of the tamper bits beneath the ties; separate actuating means for raising and lowering the supports for the respective tamper groups; a chair on the car; and manual means convenient of reach by an operator seated in the chair, for independently controlling said actuating means.

18. Railway track ballast tamping apparatus according to claim 17, wherein the suspension rods are composed respectively of telescoping components with interposed compression spring means, whereby the tampers are permitted to yield individually in the event of abnormal resistance of the ballast stones to being compacted beneath the ties by the hammering and compressing action of the tampers.

19. Railway track ballast tamping apparatus according to claim 17, wherein the tamper groups are disposed beyond one end of the car; and wherein the chair is so positioned as to afford the seated operator unobstructed view of the tampers at all times.

20. In railway track ballast tamping apparatus, a car with wheels for mobility on the track rails; a support guided for up and down movement on the car; power means on the car for so moving the support; a group of at least four power tampers pivotally suspended individually from the support centrally over a rail and adapted to pack ballast beneath a tie in one of the regions of rail support; and arcuate cams cooperative with projections on the individual tampers in positively directing the tampers radially of the region of rail support as the support aforesaid is lowered.

21. Railway track ballast tamping apparatus according to claim 20, wherein the tampers are of the pneumatically-actuated percussion type, wherein the power means is in the form of a double-acting cylinder with its piston connected to the movable support; and further including automatic means on the car for admitting compressed air to the tampers as the support is lowered; and manual valve means on the car for controlling admission of compressed air to the cylinder to raise and lower the support during the tamping.

22. Railway track ballast tamping apparatus according to claim 20, wherein a yielding means is interposed in the suspension for each tamper as and for the purpose described.

23. Railway track ballast tamping apparatus according to claim 22, wherein the tampers are individually suspended from the support by rods, each such rod comprising two sections which are slidable endwise relative to each other and between which a compression spring is interposed as and for the purpose described.

24. In railway track ballast tamping apparatus, a car with wheels for mobility on the track rails; a transversely-arranged crosshead guided for up and down movement on the car; power means for so moving the crosshead; two groups each of at least four power tampers pivotally suspended individually from the crosshead at opposite ends centrally over the rails and adapted to pack ballast beneath the ties in the respective regions of rail support; and arcuate cams on the car cooperative with projections on the individual tampers in positively directing the tampers of the respective groups radially toward the regions of rail support as the crosshead is lowered.

25. Railway track ballast tamping apparatus according to claim 24, wherein the tampers are of the pneumatically-actuated percussion type, wherein the power means is in the form of a double-acting vertically-arranged pressure fluid cylinder with its piston connected to the crosshead at the center; and further including automatic means on the car for admitting compressed air to the tampers as the crosshead is lowered; and manual valve means on the car for controlling admission of compressed air to the cylinder to raise and lower the support during the tamping.

26. Railway track ballast tamping apparatus according to claim 24, wherein a yielding means is interposed in the suspension for each tamper as and for the purpose described.

27. Railway track ballast tamping apparatus according to claim 24, wherein the tampers are individually suspended from the crosshead by rods, each such rod comprising two sections which are slidable endwise relative to each other and between which a compression spring is interposed as and for the purpose described.

28. Railway track ballast tamping apparatus according to claim 24, further including a self-releasing latch means for holding the crosshead raised with the tampers clear of the track bed during normal travel of the car on the rails.

29. In railway track ballast tamping apparatus, a car with wheels for mobility on the track rails; a carriage shiftable longitudinally of the car; a crosshead guided for up and down movement on the carriage; power means on the carriage for so moving the crosshead; two groups each of at least four power tampers pivotally suspended individually from the crosshead at opposite ends centrally over the track rails and adapted to pack ballast beneath the ties in the respective regions of rail support; and arcuate cams on the carriage cooperative with projections on the individual tampers in positively directing the tampers of the respective groups radially toward the regions of rail support as the crosshead is lowered.

30. Railway track ballast tamping apparatus according to claim 29, further including a seat on the carriage for an operator from which the action of the tampers can be readily observed; and means convenient of access to the seated operator for controlling the power means for raising and lowering the crosshead.

31. Railway track ballast tamping apparatus according to claim 29, wherein the carriage is provided with wheels, a reversible propelling motor therefor, and a seat for an operator; and further including manual means convenient of access to the seated operator for controlling the crosshead actuating means; and manual means for controlling the carriage propelling motor.

32. In railway track ballast tamping apparatus, a car with wheels for mobility on the track rails; a carriage shiftable longitudinally of the car; a pair of transversely-aligned crossheads guided for independent up and down movement on the carriage; individual power means for so moving the crossheads; groups each of at least four power tampers pivotally suspended individually from the respective crosshead centrally over the respective track rails and adapted to pack ballast beneath a tie in the regions of rail support; and arcuate cams on the carriage cooperative with projections on the individual tampers in positively directing the tampers of the respective groups radially toward the regions of rail support as the crossheads are lowered.

33. Railway track ballast tamping apparatus, according to claim 32, wherein the tampers are of the pneumatically-actuated percussion type, wherein the power means for actuating each crosshead is in the form of a vertically-arranged double-acting cylinder fixedly positioned on the carriage with its piston connected to the crosshead at the center, a reversible air motor for shifting the carriage on the car; automatic means on the carriage for admitting compressed air to the tampers of the respective groups as the corresponding crossheads are lowered; and further including separate manual valve means on the car for controlling admission of pressure fluid to the respective cylinders, and for controlling the supply of compressed air to the reversible motor.

34. Railway track ballast tamping apparatus according to claim 32, wherein a yielding means is interposed in the suspension for each tamper as and for the purpose described.

35. Railway track ballast tamping apparatus according to claim 32, wherein the tampers of each group are individually suspended from the corresponding crosshead by rods, each such rod comprising two sections which are slidable endwise relatively and between which a compression spring is interposed as and for the purpose described.

36. In railway track ballast tamping apparatus, a car with wheels for mobility on the track rails; a reversible air motor for propelling the car; a pair of transversely aligned crossheads guided for independent up and down movement on the car; individual double-acting cylinders for so moving the crossheads; groups each of at least four pneumatically-actuated percussion tampers pivotally suspended individually from the respective crossheads centrally over the respective track rails and adapted to pack the ballast beneath the ties in the regions of rail support; arcuate cams on the carriage cooperative with projections on the individual tampers for positively directing the tampers of the respective groups radially of the regions of rail support as the crossheads are lowered; automatic means for admitting compressed air to the tampers of the respective groups as the corresponding crossheads are lowered; and separate manual valve means for controlling supply of compressed air to the reversible propelling motor and supply of compressed air to the individual raising and lowering cylinders.

37. Railway track ballast tamping apparatus according to claim 36, wherein a yielding means is interposed in the suspension for each tamper as and for the purpose described.

38. Railway track ballast tamping apparatus according to claim 36, wherein the tampers are individually suspended from the crossheads by rods, each such rod comprising two sections which are slidable endwise relative to each other and between which a compression spring is interposed as and for the purpose described.

39. Railway track ballast tamping apparatus according to claim 5, wherein the upstanding columns are capped, the upstanding members affixed to the second crosshead are capped, and wherein the arresting means includes drop rods axially within the tops of the respective columns, having enlargements at their lower ends to engage with the undersides of the caps of the upstanding plungers on the second crosshead.

40. Railway track ballast tamping apparatus, comprising a car having wheels adapted to run on track rails, two crossheads extending trnsversely of said car in transverse alignment with each other and guided for independent up and down movement on said car, individual power means for so moving said crossheads, a group of tampers suspended from each of said crossheads and arranged centrally over the respective track rails and adapted to pack ballast beneath a tie in a region of rail support, each group comprising at least four tampers pivotally connected adjacent their upper ends to said crosshead, and cams on the car cooperative with projections on the individual tampers for rocking them about their pivots to force the lower ends of said tampers toward the regions of rail support as said crossheads are lowered.

41. Railway track ballast tamping apparatus, comprising a car having wheels adapted to run on track rails, two upper crossheads extending transversely of said car in transverse alignment with each other and guided for independent up and down movement on said car, individual power means for so moving said upper crossheads, a group of tampers suspended from each of said upper crossheads by links pivotally connected to said upper crossheads and to said tampers and arranged centrally over the respective track rails and adapted to pack ballast beneath a tie in a region of rail support, each group comprising at least four tampers, a lower crosshead beneath each upper crosshead guided for independent up and down movement on said car, means limiting the extent of downward movement of each lower crosshead relative to its upper crosshead, and cam means on said lower crosshead cooperative with projections on the individual tampers for rocking them about their pivots to said links to force the lower ends of said tampers toward the regions of rail support as said upper crossheads are lowered relative to said lower crossheads.

References Cited in the file of this patent

UNITED STATES PATENTS

| Number | Name | Date |
| --- | --- | --- |
| Re. 23,687 | Hursh et al. | July 21, 1953 |
| 594,729 | Crosby | Nov. 30, 1897 |
| 890,659 | Kellner | June 16, 1908 |
| 1,555,194 | Everett | Sept. 29, 1925 |
| 1,618,181 | Friend | Feb. 22, 1927 |
| 1,780,989 | Talboys | Nov. 11, 1930 |
| 1,831,670 | Lavan | Nov. 10, 1931 |
| 2,052,943 | Schenchzer | Sept. 1, 1936 |
| 2,303,245 | Weyandt | Nov. 24, 1942 |
| 2,354,860 | Hartsock | Aug. 1, 1944 |
| 2,482,111 | Jackson | Sept. 20, 1949 |

FOREIGN PATENTS

| 431,359 | Germany | of 1926 |